(12) United States Patent
Uhl

(10) Patent No.: US 7,503,142 B1
(45) Date of Patent: *Mar. 17, 2009

(54) INSERTABLE PEST CATCHING DEVICE

(76) Inventor: Michael A. Uhl, 5481 W. 2000 South, Mendon, UT (US) 84325

(*) Notice: Subject to any disclaimer, the term of this patent is extended or adjusted under 35 U.S.C. 154(b) by 0 days.

This patent is subject to a terminal disclaimer.

(21) Appl. No.: 11/688,204

(22) Filed: Mar. 19, 2007

Related U.S. Application Data

(63) Continuation-in-part of application No. 11/111,626, filed on Apr. 20, 2005, now Pat. No. 7,222,453.

(60) Provisional application No. 60/565,678, filed on Apr. 27, 2004.

(51) Int. Cl.
A01M 1/10 (2006.01)
A01M 1/12 (2006.01)
A01M 23/08 (2006.01)

(52) U.S. Cl. .............. 43/122; 43/65; 43/113; 222/81; 222/90; 141/331; 141/340

(58) Field of Classification Search .......... 43/65, 43/66, 100, 102, 121, 122, 113; 222/80, 222/81, 89, 90, 460, 566; 30/2, 400, 407, 30/443; 141/331–334, 337, 338, 340–343
See application file for complete search history.

(56) References Cited

U.S. PATENT DOCUMENTS

| 149,918 | A | * | 4/1874 | Clough | 43/65 |
|---|---|---|---|---|---|
| 209,666 | A | * | 11/1878 | Decou | 141/340 |
| 218,175 | A | * | 8/1879 | Hollingshead | 43/65 |
| 474,036 | A | * | 5/1892 | Wood | 141/340 |
| 529,109 | A | * | 11/1894 | Burgess | 43/121 |
| 549,305 | A | * | 11/1895 | Barnes | 222/90 |
| 554,616 | A | * | 2/1896 | Cook | 43/121 |

(Continued)

FOREIGN PATENT DOCUMENTS

CA    2067825 A * 10/1993

(Continued)

OTHER PUBLICATIONS

McNaughton, Inc., Wasp Trap, Unknown, One page internet advertisement.*

(Continued)

*Primary Examiner*—Darren W Ark

(57) ABSTRACT

The insertable pest catching device is an invention that because of its unique geometry and design provides for the simple and cost effective catching of pests such as hornets and yellow jackets. The device is principally intended for use in combination with an empty plastic two-liter volume soda pop bottle. In practice, an attractant such as a predetermined amount of sugar water is placed into a capped plastic bottle and the funnel shaped device is retentatively pressed into the side of the bottle. The device in combination with the bottle creates an attraction to pests. The pests are guided into the bottle through the funnel and subsequently die within the bottle. After a predetermined quantity of pests are trapped within the bottle, the bottle, with the device still inserted may be discarded as an entire assembly. Thus the disassembly, mess, and washing common with prior art pest catching devices are avoided. In certain embodiments, multiple devices may be inserted into a single bottle.

25 Claims, 16 Drawing Sheets

U.S. PATENT DOCUMENTS

| | | | | |
|---|---|---|---|---|
| 590,032 | A * | 9/1897 | Anderson | 43/65 |
| 720,990 | A * | 2/1903 | Williams | 43/113 |
| 726,140 | A * | 4/1903 | Campbell, Sr. | 43/65 |
| 766,083 | A * | 7/1904 | Watts | 222/90 |
| 836,052 | A * | 11/1906 | Pool | 43/65 |
| 858,157 | A * | 6/1907 | Day | 43/65 |
| 869,556 | A * | 10/1907 | Haas | 43/113 |
| 914,571 | A * | 3/1909 | Heath et al. | 43/65 |
| 956,138 | A * | 4/1910 | McAleer | 43/65 |
| 1,016,135 | A * | 1/1912 | Foans | 222/90 |
| 1,139,717 | A * | 5/1915 | Pipenhagen | 43/121 |
| 1,208,987 | A * | 12/1916 | Lacht | 43/121 |
| 1,327,230 | A * | 1/1920 | Fairbanks | 43/121 |
| 1,388,786 | A * | 8/1921 | Albrecht et al. | 43/65 |
| 1,437,251 | A * | 11/1922 | Kesling | 43/113 |
| 1,488,178 | A * | 3/1924 | Floyd et al. | 43/113 |
| 1,499,222 | A * | 6/1924 | Kiley | 43/121 |
| 1,505,651 | A * | 8/1924 | Loeschen | 43/113 |
| 1,618,513 | A * | 2/1927 | Coghill | 43/66 |
| RE16,842 | E * | 1/1928 | Hampton | 141/332 |
| 1,667,876 | A * | 5/1928 | Steiner | 43/113 |
| 1,682,575 | A * | 8/1928 | Leon et al. | 43/107 |
| 1,705,312 | A * | 3/1929 | Rovano | 141/340 |
| 1,772,729 | A * | 8/1930 | Pisani | 43/107 |
| 1,820,610 | A * | 8/1931 | Eves | 141/340 |
| 1,867,252 | A * | 7/1932 | Crigler | 43/121 |
| 1,911,076 | A * | 5/1933 | Gandola | 222/90 |
| 1,946,509 | A * | 2/1934 | Trammell | 43/113 |
| 1,979,337 | A * | 11/1934 | Matthiessen, Jr. | 222/90 |
| 1,981,683 | A * | 11/1934 | Wentzell | 43/113 |
| 2,000,193 | A * | 5/1935 | Schroder | 43/121 |
| 2,007,449 | A * | 7/1935 | Kernodle et al. | 222/90 |
| 2,052,445 | A * | 8/1936 | Burns | 222/90 |
| 2,102,978 | A * | 12/1937 | Slining | 222/90 |
| 2,118,366 | A * | 5/1938 | Spielvogel | 222/81 |
| 2,158,502 | A * | 5/1939 | Harrison | 222/90 |
| 2,162,623 | A * | 6/1939 | Livingston | 43/65 |
| 2,361,321 | A * | 10/1944 | Schleier | 43/65 |
| 2,421,589 | A * | 6/1947 | Wiswell | 222/89 |
| 2,424,421 | A * | 7/1947 | Temme | 43/121 |
| 2,569,833 | A * | 10/1951 | Simpson, Sr. | 43/65 |
| 2,589,360 | A * | 3/1952 | Ferguson | 43/65 |
| 2,606,327 | A * | 8/1952 | Eckart et al. | 141/331 |
| 2,609,968 | A * | 9/1952 | Ream | 222/90 |
| 2,666,553 | A * | 1/1954 | Tammi | 222/90 |
| 2,671,576 | A * | 3/1954 | Kuehn | 222/90 |
| 2,796,696 | A * | 6/1957 | Kea | 43/121 |
| 2,898,698 | A * | 8/1959 | Bair | 43/113 |
| 2,946,560 | A * | 7/1960 | Ferm | 141/331 |
| 3,002,657 | A * | 10/1961 | Liljemark | 222/89 |
| 3,196,577 | A * | 7/1965 | Plunkett | 43/113 |
| 3,201,015 | A * | 8/1965 | Wagaman | 141/332 |
| 3,201,893 | A * | 8/1965 | Gesmar | 43/113 |
| 3,206,073 | A * | 9/1965 | Scislowicz | 222/80 |
| 3,271,894 | A * | 9/1966 | Manno et al. | 43/113 |
| 3,289,218 | A * | 12/1966 | Mehilos | 141/333 |
| 3,320,692 | A * | 5/1967 | Hellen | 43/65 |
| 3,343,724 | A * | 9/1967 | Malpas | 222/90 |
| 3,460,715 | A * | 8/1969 | Jones et al. | 222/90 |
| 3,771,578 | A * | 11/1973 | Huff | 141/340 |
| 3,796,001 | A * | 3/1974 | Jackson | 43/113 |
| 3,820,273 | A * | 6/1974 | Novak | 43/113 |
| 3,821,861 | A * | 7/1974 | Jalbert | 43/65 |
| 3,885,341 | A * | 5/1975 | Kuchenbecker et al. | 43/65 |
| 3,902,652 | A * | 9/1975 | Malcolm | 222/81 |
| 4,150,768 | A * | 4/1979 | Maynard, Jr. | 222/89 |
| 4,208,828 | A * | 6/1980 | Hall et al. | 43/121 |
| 4,212,129 | A * | 7/1980 | Shumate | 43/113 |
| 4,218,842 | A * | 8/1980 | Anderson | 43/122 |
| 4,476,647 | A * | 10/1984 | Hall, Jr. | 43/122 |
| 4,531,245 | A * | 7/1985 | Lowd et al. | 141/337 |
| 4,551,941 | A * | 11/1985 | Schneidmiller | 43/121 |
| 4,681,243 | A * | 7/1987 | Takasugi | 222/81 |
| 4,706,410 | A * | 11/1987 | Briese | 43/107 |
| 4,794,724 | A * | 1/1989 | Peters | 43/122 |
| 4,823,505 | A * | 4/1989 | Jackson | 43/124 |
| 4,858,374 | A * | 8/1989 | Clemons | 43/122 |
| 4,873,787 | A * | 10/1989 | Schneidmiller | 43/122 |
| 4,881,662 | A * | 11/1989 | Tallman | 222/81 |
| 4,899,485 | A * | 2/1990 | Schneidmiller | 43/122 |
| 4,945,673 | A * | 8/1990 | Lavelle | 43/124 |
| 5,058,312 | A * | 10/1991 | Jackson | 43/124 |
| 5,081,788 | A * | 1/1992 | Dowd et al. | 43/113 |
| 5,090,152 | A * | 2/1992 | Ling | 43/65 |
| 5,095,185 | A * | 3/1992 | Fuchs, Jr. | 141/340 |
| 5,209,010 | A * | 5/1993 | Vickery | 43/139 |
| 5,226,254 | A * | 7/1993 | MacMenigall | 43/107 |
| 5,228,233 | A * | 7/1993 | Butler et al. | 43/113 |
| 5,274,949 | A * | 1/1994 | Beaton | 43/113 |
| 5,301,456 | A * | 4/1994 | Jobin et al. | 43/113 |
| 5,309,668 | A * | 5/1994 | Barton | 43/121 |
| 5,309,669 | A * | 5/1994 | Jackson | 43/124 |
| D347,676 | S | 6/1994 | VanWallendael | D22/122 |
| 5,323,556 | A * | 6/1994 | Carle | 43/113 |
| 5,361,533 | A * | 11/1994 | Pepper | 43/124 |
| 5,392,558 | A * | 2/1995 | Blomquist | 43/107 |
| 5,400,923 | A * | 3/1995 | Golias et al. | 222/89 |
| 5,406,743 | A * | 4/1995 | McSherry et al. | 43/122 |
| 5,452,540 | A | 9/1995 | Dowd et al. | 43/107 |
| D371,418 | S | 7/1996 | Rubel | D22/122 |
| 5,542,207 | A * | 8/1996 | Morris, Sr. | 43/132.1 |
| 5,551,606 | A * | 9/1996 | Rai et al. | 222/460 |
| 5,557,880 | A * | 9/1996 | Schneidmiller | 43/121 |
| 5,568,790 | A * | 10/1996 | Musgrave | 43/65 |
| 5,682,706 | A | 11/1997 | Altenburg | 43/122 |
| 5,884,810 | A * | 3/1999 | Vizcarra et al. | 222/90 |
| 6,095,433 | A * | 8/2000 | Langdon | 222/90 |
| 6,112,452 | A * | 9/2000 | Campbell | 43/107 |
| 6,134,826 | A * | 10/2000 | Mah | 43/113 |
| 6,138,402 | A * | 10/2000 | Wotton | 43/122 |
| 6,158,165 | A * | 12/2000 | Wilson | 43/66 |
| 6,502,347 | B1 * | 1/2003 | Carver, Sr. | 43/113 |
| 6,532,695 | B1 * | 3/2003 | Alvarado | 43/122 |
| 6,546,667 | B1 * | 4/2003 | Carter | 43/107 |
| 6,550,181 | B1 * | 4/2003 | Ray | 43/107 |
| 6,609,329 | B2 * | 8/2003 | McCallum | 43/107 |
| 6,626,327 | B2 * | 9/2003 | Makino et al. | 222/81 |
| 6,637,149 | B1 * | 10/2003 | Bauer | 43/107 |
| 6,739,363 | B2 * | 5/2004 | Walter et al. | 141/340 |
| 6,754,988 | B1 * | 6/2004 | Downey | 43/107 |
| 6,786,001 | B1 * | 9/2004 | Piper et al. | 43/113 |
| 6,910,298 | B2 * | 6/2005 | Schneidmiller | 43/65 |
| 6,925,749 | B2 * | 8/2005 | Wong | 43/121 |
| 7,100,324 | B2 * | 9/2006 | Lenker | 43/107 |
| 7,222,453 | B2 * | 5/2007 | Uhl | 43/122 |
| 7,412,797 | B1 * | 8/2008 | Hiscox | 43/122 |
| 2002/0011021 | A1 | 1/2002 | McCallum | 43/122 |
| 2002/0157301 | A1 | 10/2002 | Chrestman | 43/122 |
| 2003/0014904 | A1 | 1/2003 | Chrestman | 43/122 |
| 2003/0209575 | A1 * | 11/2003 | Bremner et al. | 222/566 |
| 2005/0198892 | A1 * | 9/2005 | Lin | 43/66 |
| 2006/0137240 | A1 * | 6/2006 | Dismore | 43/65 |

FOREIGN PATENT DOCUMENTS

| | | | |
|---|---|---|---|
| DE | 2901832 A1 | * | 7/1980 |
| FR | 2298947 A | * | 10/1976 |
| FR | 2386257 A | * | 12/1978 |
| GB | 2052942 A | * | 2/1981 |
| GB | 2283896 A | * | 5/1995 |
| GB | 2396092 A | * | 6/2004 |
| JP | 2001-103900 A | * | 4/2001 |
| JP | 2001-169709 A | * | 6/2001 |
| JP | 2001-269104 A | * | 10/2001 |

| | | | | |
|---|---|---|---|---|
| JP | 2004-73144 A | * | 3/2004 | |
| JP | 2004-97018 A | * | 4/2004 | |
| JP | 2005-117970 A | * | 5/2005 | |
| JP | 2005-143312 A | * | 6/2005 | |
| JP | 2007-60928 A | * | 3/2007 | |
| KR | 2003082677 A | * | 10/2003 | |
| KR | 2004092310 A | * | 11/2004 | |
| WO | WO-96/08964 A1 | * | 3/1996 | |
| WO | WO-01/64032 A1 | * | 9/2001 | |

OTHER PUBLICATIONS

Farnam Horse, Inc., Milk Jugg Trap, Unknown, One page internet advertisement.*

* cited by examiner

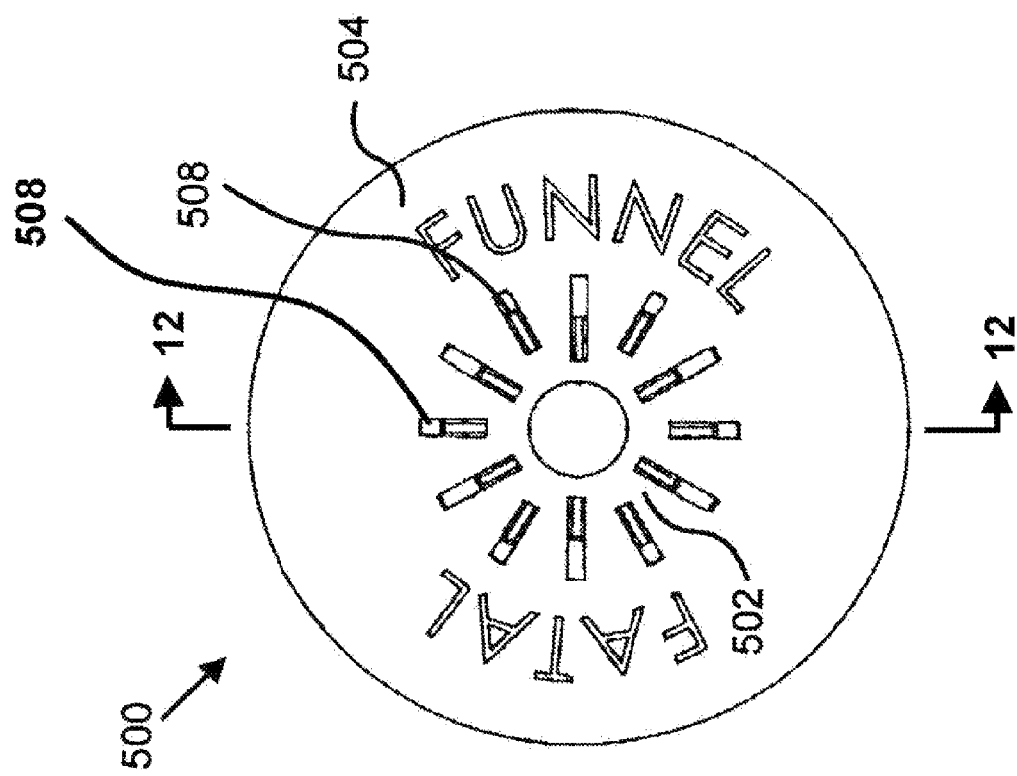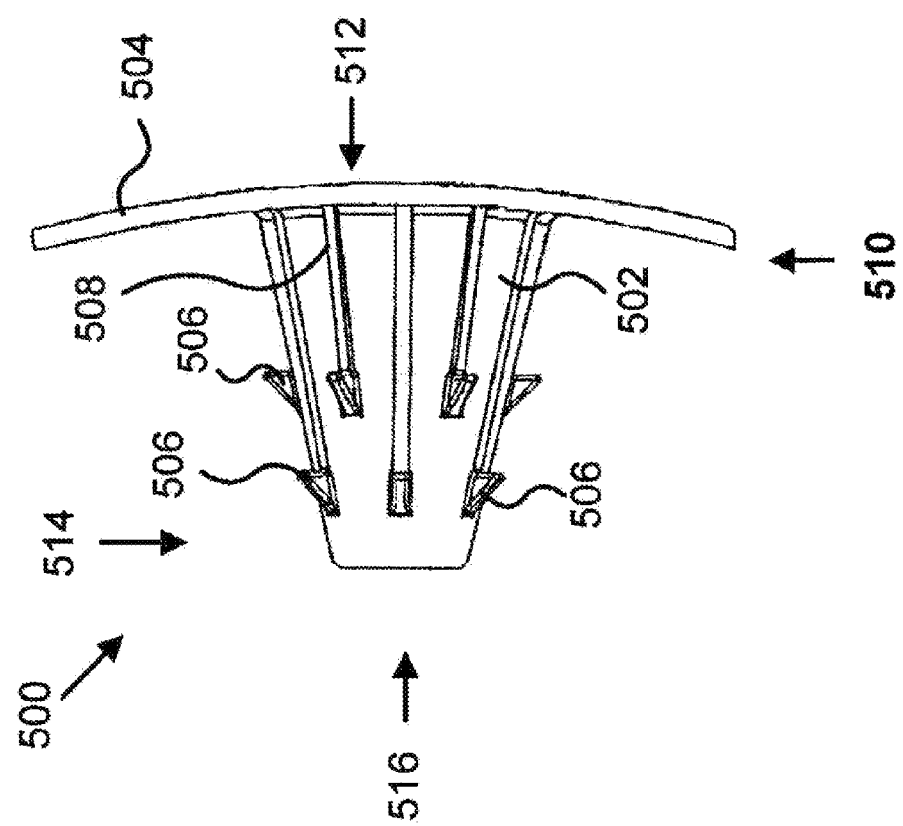
Fig 11
Fig 10

INSERTABLE PEST CATCHING DEVICE

This nonprovisional utility application is a continuation-in-part of application Ser. No. 11/111,626 filed Apr. 20, 2005 now U.S. Pat. No. 7,222,453 which was a nonprovisional utility application claiming priority to provisional application Ser. No. 60/565,678 filed Apr. 27, 2004, the specifications of which are incorporated herein by reference. The benefit of the filing date of these earlier filed applications is claimed under 35 U.S.C. § 119(e) and 35 U.S.C. § 120.

BACKGROUND OF THE INVENTION

1. Field of the Invention

This invention relates to devices used to catch pests and more particularly relates to devices that are inserted into a container in order to trap pests inside a container.

2. Description of the Related Art

Pests, such as insects, rodents, slugs, and the like, frequently inhabit greenhouses, gardens, pantries, kitchens, or almost any area designated for human use or enjoyment. To alleviate problems caused by pests, traps have been designed to capture the bothersome creatures. A common pest outdoors is the hornet or wasp. The flying, stinging insects have caused early termination of many outdoor activities and have frustrated numerous gardeners. Many traps have been specially designed to catch wasps.

FIG. 1 illustrates a typical wasp trap 100 known in the art. The trap 100 includes a base 102 with openings 104 for the wasps to enter. The trap 100 further comprises an inverted funnel 106 inside of a container 108. The container 108 is connected to the base 102 and may include a device 110 for hanging the trap 100. An attractant may be placed within the base 102 to lure wasps. One draw back to the trap 100 is, the trap 100 must be cleaned to be reused or must be completely discarded. The apparatus is also bulky and must be stored when not in use. Furthermore, this type of trap 100 is typically for home use and is not easily transportable because the trap 100 must be cleaned. Also, the trap 100 is intended to be hung and cannot rest on a flat surface because of the design of the base 102.

FIG. 2 illustrates another example of a wasp trap 200 known in the art. The trap 200 includes an entrance device 202 and a bag 204. The wasps enter through the entrance device 202 and are trapped in the bag 204. In some cases, an attractant may fill the bottom of the bag 204 to lure the wasps. Because the trap 200 has a single entrance on top of the bag 204, the number of wasps entering the trap may be limited. Unlike the wasp trap 100, the trap 200 is disposable. However, the trap 200 must be repurchased, which causes unnecessary expense and hassle. In addition, the bag 204 may not be attractive to onlookers, especially when full of wasps. Furthermore, the bag 204, lacking a solid shape, must also be hung to function as a wasp trap.

FIG. 3 is another wasp trap 300 known in the art. The wasp trap 300 comprises a base container 302 and a covering 304 with an eyelet and string to hang the trap 300. The base container 302 includes a plurality of holes 306 for wasps to enter the trap 300. The holes 306 have a tapered opening leading into the container 302. Consequently, the wasps may crawl into the holes 306 easily, but cannot exit the holes 306. In addition, the base container 302 includes smaller holes 308 to allow the aroma of an attractant to lure wasps to the trap 300. Though the trap 300 has an attractive appearance, the trap 300 must also be cleaned for reuse and is bulky to store and transport, similar to trap 100.

From the foregoing discussion, it should be apparent that a need exists for a compact, cost-effective device that effectively captures pests, and in particular, wasps. Beneficially, such a device would be reusable but not require excessive cleaning. In addition, the device may be adaptable and may be used in a variety of locations and containers.

SUMMARY OF THE INVENTION

The present invention has been developed in response to the present state of the art, and in particular, in response to the problems and needs in the art that have not yet been fully solved by currently available pest traps. Accordingly, the present invention has been developed to provide an insertable device to trap pests inside a container that overcomes many or all of the above-discussed shortcomings in the art.

The device is preferably configured to be inserted into a container. In one embodiment, the container may be a disposable two liter plastic bottle. Alternatively, the container may be a milk jug, cardboard box, or other disposable container. In a preferred embodiment, the device is inserted into an opening in the side of the container. As a result, a plurality of devices may be inserted into a single container. In select embodiments, the device may be configured to be inserted into permanent enclosures, such as eves of a building, pipes, posts, walls, etc.

The insertable device preferably comprises a funnel with a first and second end. The first end may have a wider opening than the second end. The first end may further include a flange configured to engage a wall of the container. In certain embodiments, except for the opening created by the funnel itself, the flange may seal the opening into the container. Preferably, the flange blocks the opening so insects do not escape from the container. The device may also include one or more protruding members extending from the external surface of the funnel. The protruding members are preferably configured to secure the funnel to the container. In certain embodiments, the funnel may comprise apertures to allow the aroma of an attractant to permeate the inside of the funnel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10 is an orthographic side view of an alternative embodiment of an insertable device in accordance with the present invention;

FIG. 11 is a front orthographic view of the embodiment illustrated in FIG. 10;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
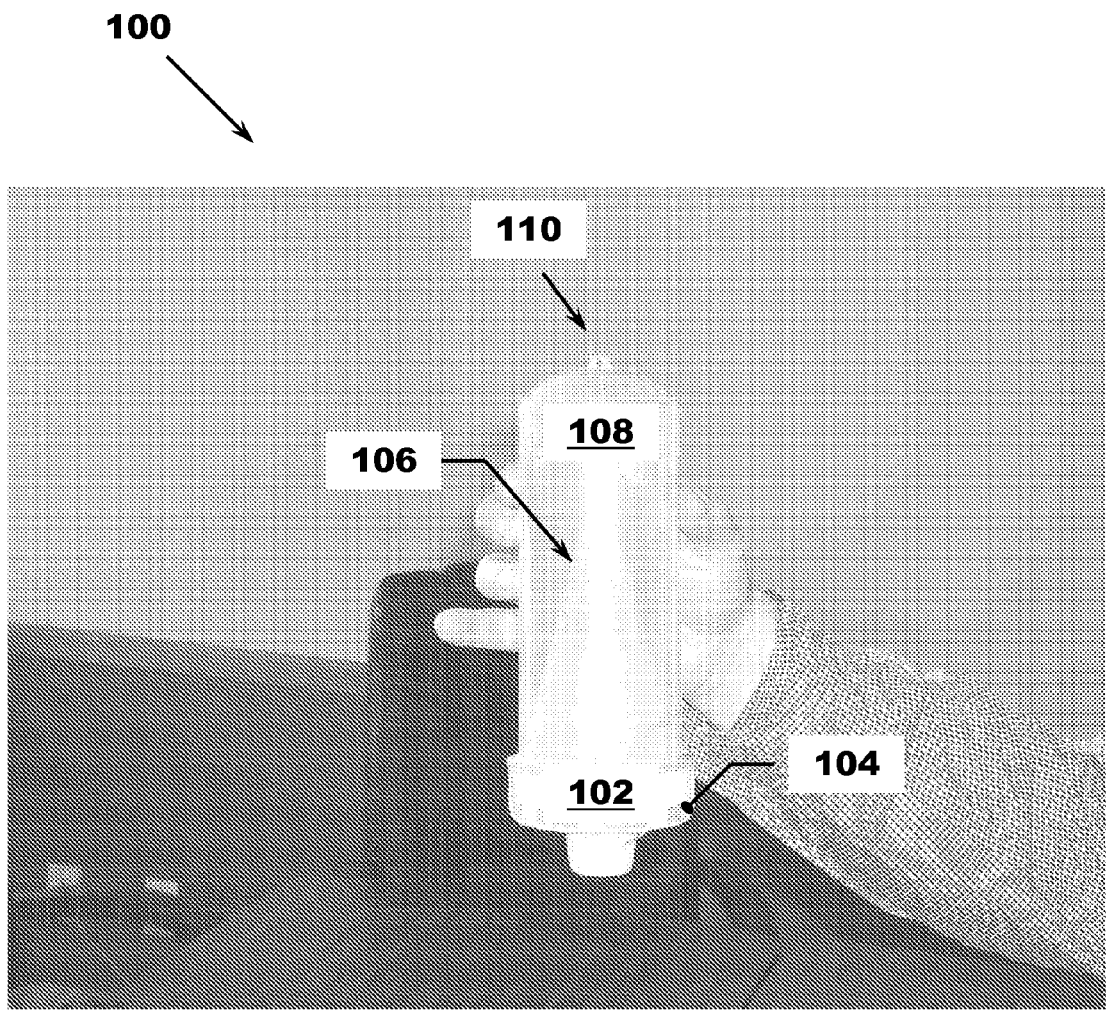
FIG. 1 is a perspective view of one embodiment of a wasp trap known in the art.
Figure 2:
FIG. 2 is a perspective view of another embodiment of a wasp trap known in the art.
Figure 3:
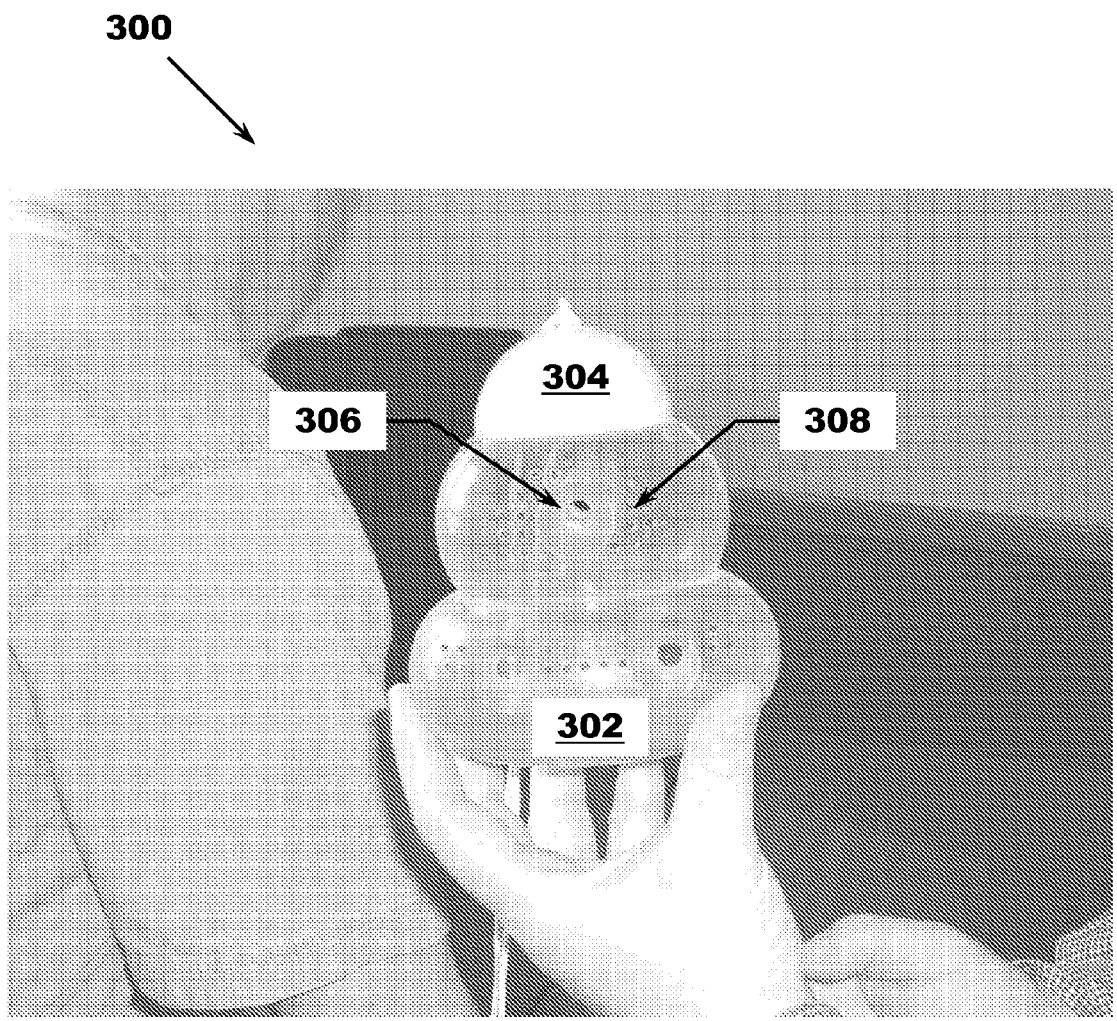
FIG. 3 is a perspective view of yet another embodiment of a wasp trap known in the art.
Figure 4:
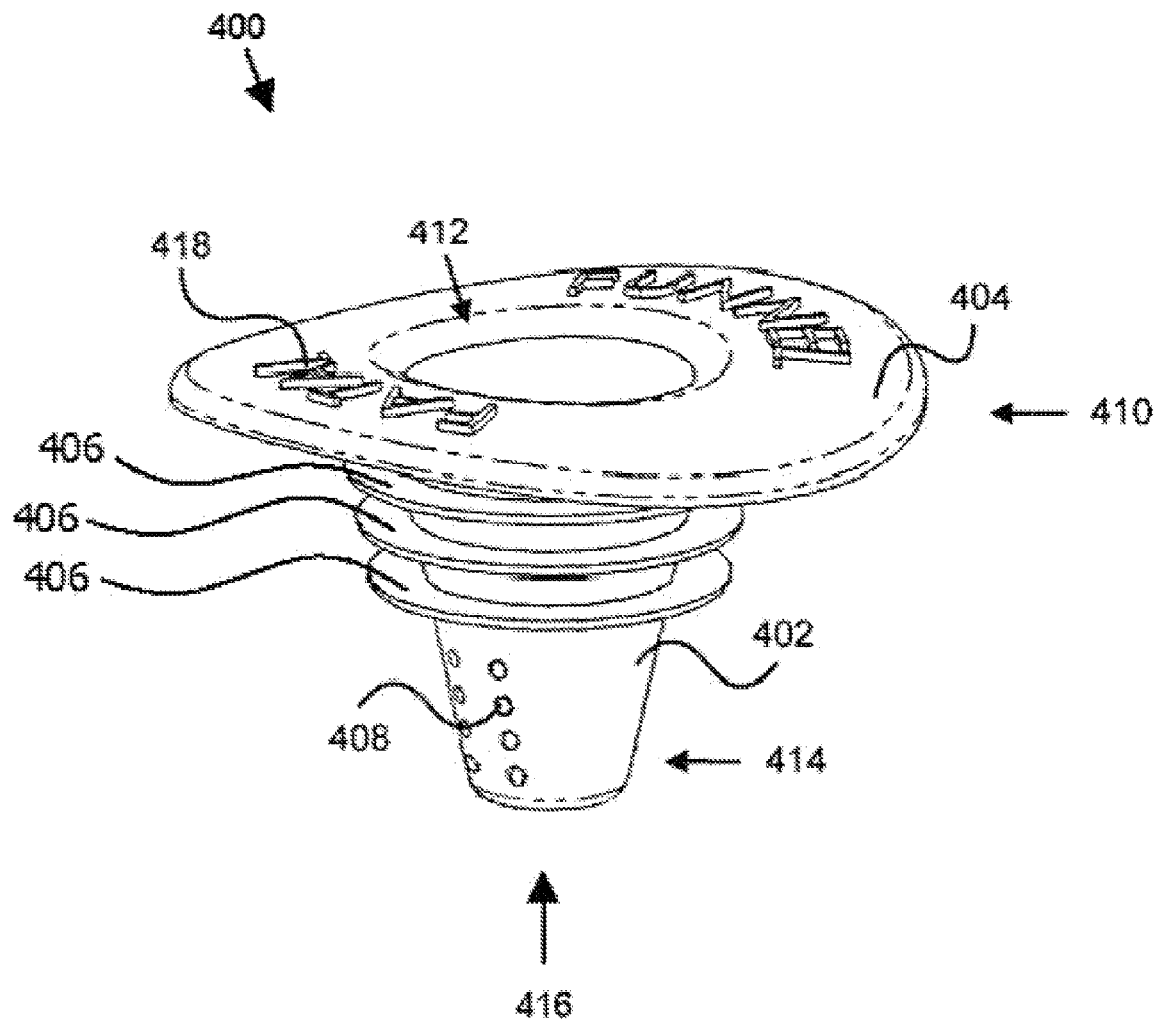
FIG. 4 is a perspective view of one embodiment of an insertable device in accordance with the present invention with phantom lines representing tangencies of surfaces; the device is shown positioned such that the front face of the device is located at the top of the figure.

FIG. 4 illustrates one embodiment of an insertable device 400 that inserts into a container. The device 400 includes a funnel 402, a flange 404, protruding members 406, and apertures 408. A first end 410 of the device 400 may comprise a wider opening 412, and a second end 414 of the device 400 may comprise a narrower opening 416. The insertable device 400 is preferably reusable and may be made from any suitable material, such as plastic, metal, wood, rubber, or the like.

Preferably, the second end 414 of the insertable device 400 is inserted into a hole in a container such that the narrow opening 416 opens into the interior of the container. Preferably, the container has a wall that is penetratable or deformable. For example, a container may comprise a disposable two liter plastic bottle, such as the type of container in which soda pop is sold. A user is preferably able to cut or create a hole or opening in the wall of the container. As a result, the user may insert the device 400 into the wall of the container. In one embodiment, the device 400 may include a blade or pointed member to create a hole or slit in a container.

Because the device 400 is inserted into the side of a container, one or more devices 400 may be inserted into a single container. Consequently, the user may customize a container according to the need for an insect trap. Preferably, the device 400 is removable from the container and may be reused. The container is preferably disposable and may be discarded after use. Also, the size of the device 400 is preferably compact enough to be transported and stored easily. In certain embodiments, the device 400 is stackable.

Figure 5:
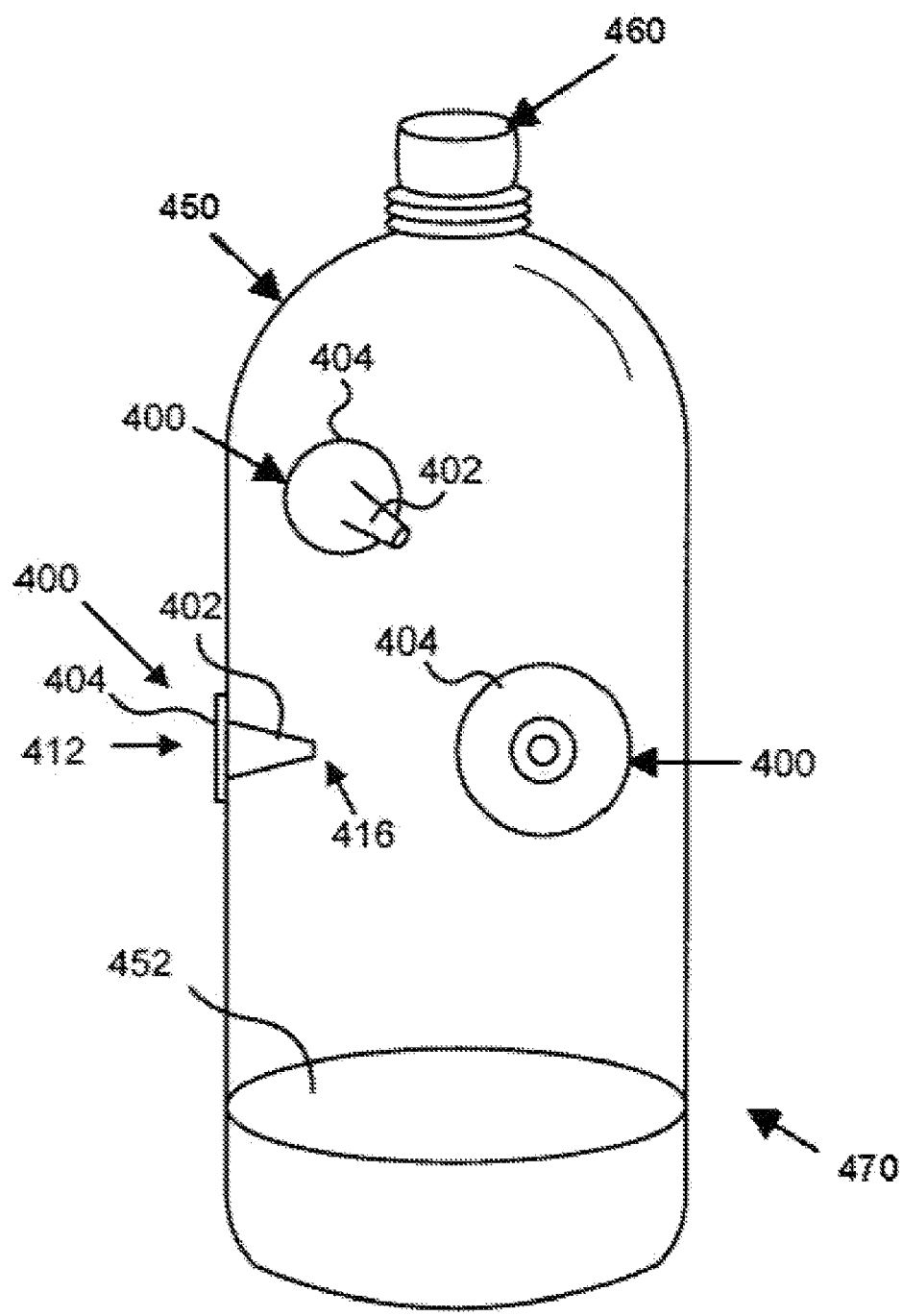
FIG. 5 is a perspective view of one embodiment of a two liter disposable bottle with a plurality of insertable devices of the present invention inserted into the side of the bottle, a portion of the bottle being shown as substantially transparent so as to reveal the insertable devices that are inserted on the far side of the figure.

FIG. 5 illustrates one embodiment of a two liter plastic bottle 450 with a plurality of insertable devices 400 inserted into the side of the bottle 450. Bottle 450 further includes lid 460 sealingly and detachably attached to bottle 450. Bottle 450 having lid 460 attached to bottle 450 and at least one insertable device 400 inserted in a wall of bottle 450 comprises pest catching apparatus 470. Insects may enter the bottle 450 simultaneously through different insertable devices 400. To lure insects into the bottle 450, an attractant 452 may be placed in the bottom of the container 450. Known attractants include sugar water, food, manufactured attractants, and the like. The vapors of the attractant 452 preferably escape through the insertable devices 400. Multiple devices 400 permit a greater amount of attractant vapors to escape the container 450.

The funnel 402 gradually tapers from a wider opening 412 to a narrower opening 416 such that pests may enter the device 400 from the wider opening 412 and then proceed through the funnel 402 to enter the bottle 450 from the narrower opening 416. Preferably, the narrower opening 416 is sized relative to the type of pest being trapped, such that opening 416 is sufficiently large enough for the intended pest to enter into bottle 450 through opening 416, but not so large that the intended pest may easily escape bottle 450 through opening 416. Consequently, the pest is not easily able to exit the container 450 through the narrow opening 416, since the creature typically tries to exit through the transparent walls of the container 450 or through the apertures 408 in the funnel 402.

Referring back to FIG. 4, the funnel 402 may further comprise a flange 404 attached at the first end 410 of the device 400. The flange 404 is preferably configured to engage a wall of the container 450. In one embodiment, the flange 404 is wide and circumscribes the opening 412 of the funnel 402. In a further embodiment, the flange 404 may seal the portion of the opening in the wall of the container 450 defined by the open passage between the bottle wall and funnel 402 outer surface that would otherwise not be sealed. Alternatively, the flange 404 may simply block the opening of the container such that insects do not escape from the container 450. Accordingly, the flange 404 may have various sizes, thicknesses, and profiles to accommodate different containers and openings. In one embodiment, the flange 404 is curved to further enhance the ability of the device 400 to close off gaps in the wall of the container 450. The funnel first end 410 and second end 414 define a longitudinal axis of the funnel therebetween and the flange 404 is curved such that it forms a portion of a cylindrical wall (see FIG. 6), and wherein an axis of the cylindrical wall portion is substantially perpendicular to the longitudinal axis of the funnel 402 and extends through the funnel 402. Alternatively, the flange 404 may be flat. In a further embodiment, multiple flanges 404 may extend from the funnel 402.

In one embodiment, the flange 404 may include one or more grooves (not shown) across the face. The grooves may be configured to receive a rubber band or strap. Consequently, a rubber band may be used to help secure the insertable device 400 to the container 450. A rubber band, in one embodiment, is extended around the container 450 and is placed on top of a device 400 inserted into a container 450. Preferably, one rubber band is placed in a groove of the flange 404 above the opening 412, and another rubber band is placed in a groove below the opening 412. The retracted rubber bands firmly retain the insertable device 400 in an opening in the wall of the container 450. The grooves in the flange 404 preferably prevent the rubber bands from falling off of the device 400.

In an alternative embodiment, an adhesive or fastener may be used to attach the insertable device 400 to a container 450. For example, tape, double-sided tape, Velcro®, glue, or the like may be used to fasten the back surface of the flange 404 to the wall of a container 450. In one embodiment, thick glue may be applied to the flange 404 to attach the device 400 to the container 450 such that the opening in the wall of the container 450 may be sealed. In certain instances, the insertable device 450 may be discarded with the container 450. Alternatively, an adhesive may be reapplied to an insertable device 400, and the device 400 may thus be reusable.

In certain embodiments, the face of the flange 404 may contain one or more recognizable symbols 418. In one embodiment, the symbol 418 may comprise words or a trademark. Alternatively or in addition, the symbol 418 may be a shape of a particular insect, such as a fly, wasp, bee, or the like. The symbol 418 may correspond to the type of insect the device 400 is designed to help capture. Alternatively, the symbol 418 may simply be a decorative design. In a further embodiment, the flange 404 may also be shaped to resemble a recognizable object. For example, the flange 404 may be shaped as flower petals.

As mentioned previously, the flange 404 preferably engages the wall of the container 450 to hold the device 400 in place. In addition, protruding members 406 may also be configured to secure the device 400 to the container 450.

Figure 6:
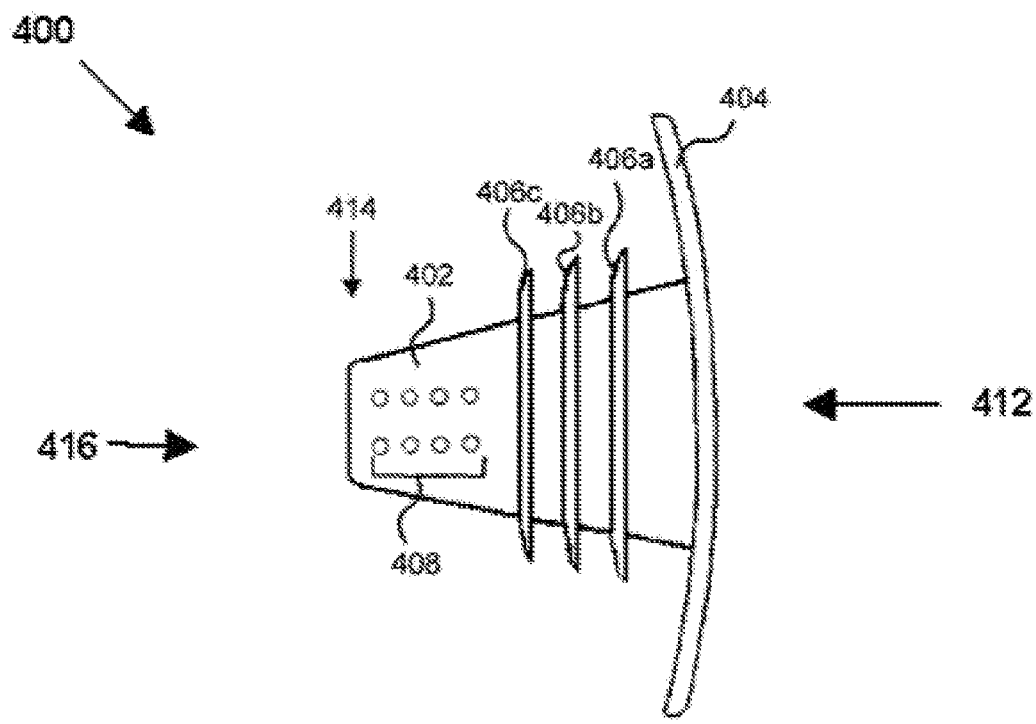
FIG. 6 is an orthographic side view of one embodiment of an insertable device in accordance with the present invention.

FIG. 6 further illustrates a side view of the insertable device 400. The protruding members 406 in the depicted embodiment resemble additional flanges circumscribing the funnel 402. The protruding members 406 may also engage the wall of the container 450. How the flange 404 and the protruding members 406 engage the wall of the container 450 depend on the type of container 450 as well as the kind of opening in the container 450.

For example, the device 400 may engage a circular hole in a container 450 differently than a slit in the wall of the container 450. In the case of a circular hole, the wall of the container 450 may rest between the flange 404 and a first protruding member 406a. Alternatively, a container wall that is slit may contact the flange 404 and slope to contact a third protruding member 406c. Consequently, the flange 404 and protruding members 406 are preferably designed to function with a variety of openings and types of containers 450.

The insertable device 400 may comprise one or more protruding members 406. A plurality of protruding members 406 may be provided to allow the device 400 to be adaptable. However, in select embodiments, the insertable device 400 may not include protruding members 406. As discussed previously, the insertable device 400 may be fastened to a container 450 with an adhesive or a fastener. Thus, the insertable device 400 may rely on the adhesive to secure the device 400 to the container 450.

Also mentioned, the funnel 402 may additionally include apertures 408. The apertures 408 preferably permit the odor of an attractant 452 within the container 450 to permeate the funnel 402. In one embodiment, the apertures 408 are holes.

Figure 7:
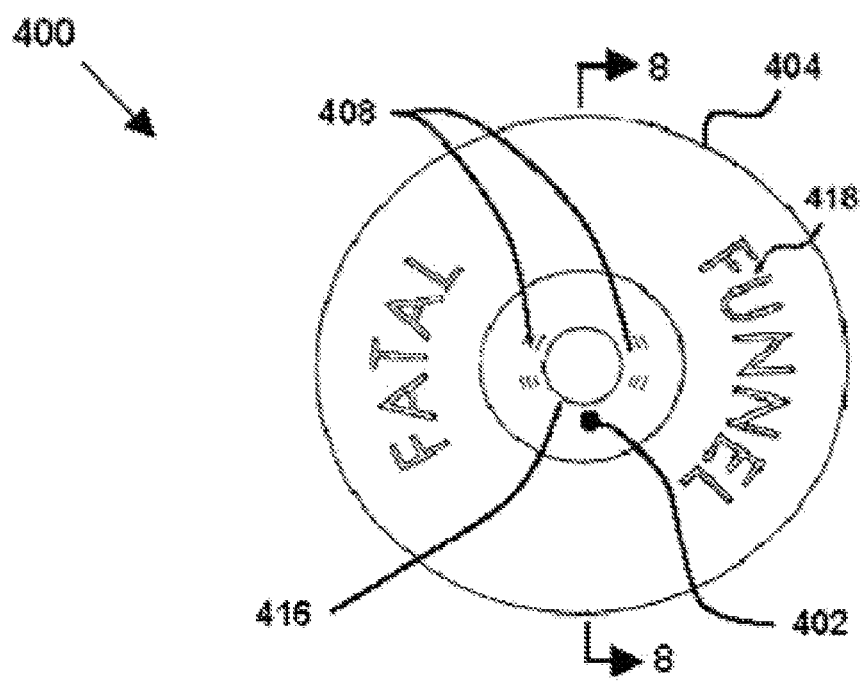
FIG. 7 is an orthographic front view of one embodiment of an insertable device in accordance with the present invention.

FIG. 7 illustrates a front view of one embodiment of an insertable device 400. The symbols 418 are depicted on the surface of the flange 404. Additionally, apertures 408 are shown from within the funnel 402. In one embodiment, the apertures 408 are positioned near the second end of the insertable device 400. Consequently, insects are lured toward the narrow opening 416 of the funnel 402. Preferably, the apertures 408 are sized to correspond to a particular type of insect, so the insects cannot escape through the apertures 408.

In one embodiment, a screen or net (not shown) may cover or replace the apertures 408 such that insects cannot crawl through the holes 408. The screen may cover the apertures 408 from the inside of the funnel 402 or from the outside of the funnel 402. Thus, the aroma of the attractant may escape the container 450 through the apertures 408 in the device 400. In a further embodiment, a removable apparatus or covering with a screen may be adaptable to a particular device 400 to cover the apertures 408. Consequently, the user may choose to apply a screen to the apertures 408 to capture smaller insects.

Figure 8:
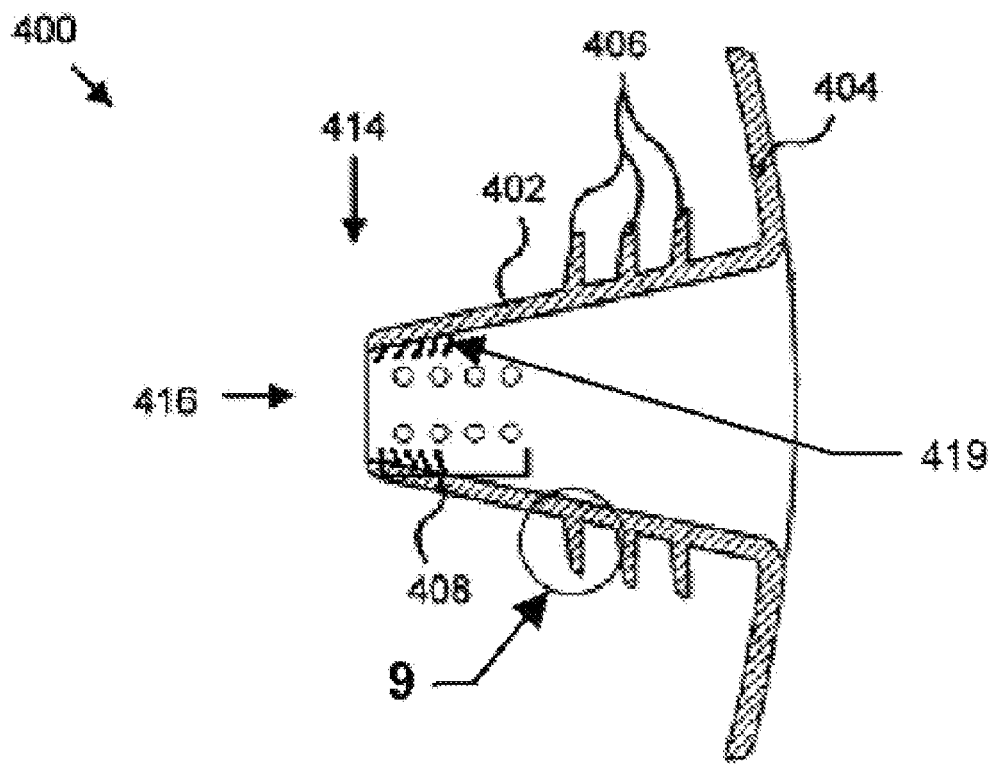
FIG. 8 is a cross-sectional view of one embodiment of an insertable device in accordance with the present invention.

FIG. 8 is a cross-sectional view of one embodiment of an insertable device 400 further illustrating the apertures 408. Also illustrated are the flange 404 and protruding members 406. In the depicted embodiment, the flange 404 and protruding members 406 are made from the same material as the funnel 402 and have been molded at the time of manufacture. In an alternative embodiment, the flange 404 and/or protruding members 406 may be welded to the funnel 402. Furthermore, the protruding members 404, 406 may be attached with an adhesive or other form of fastener.

Figure 9:
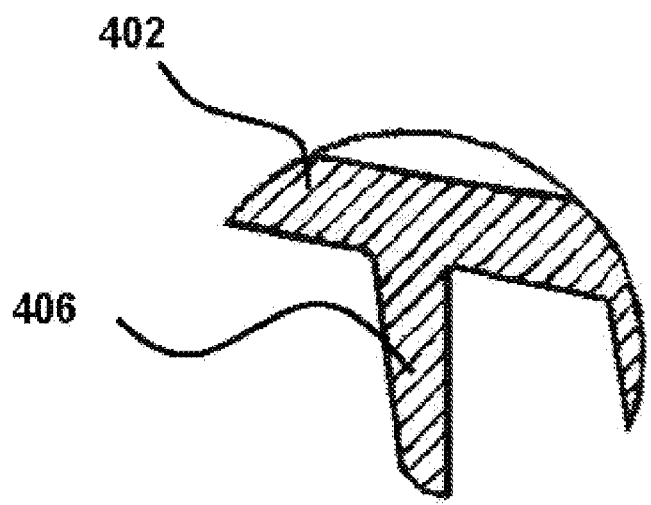
FIG. 9 is a close-up view of a protruding member shown in FIG. 8 in accordance with the present invention.

FIG. 9 illustrates in greater detail a protruding member 406. The angle of the funnel 402 tapers toward the second end. The protruding members 406 may be located in a plane parallel to a face defined by the wide opening of the funnel 402.

Figure 12:
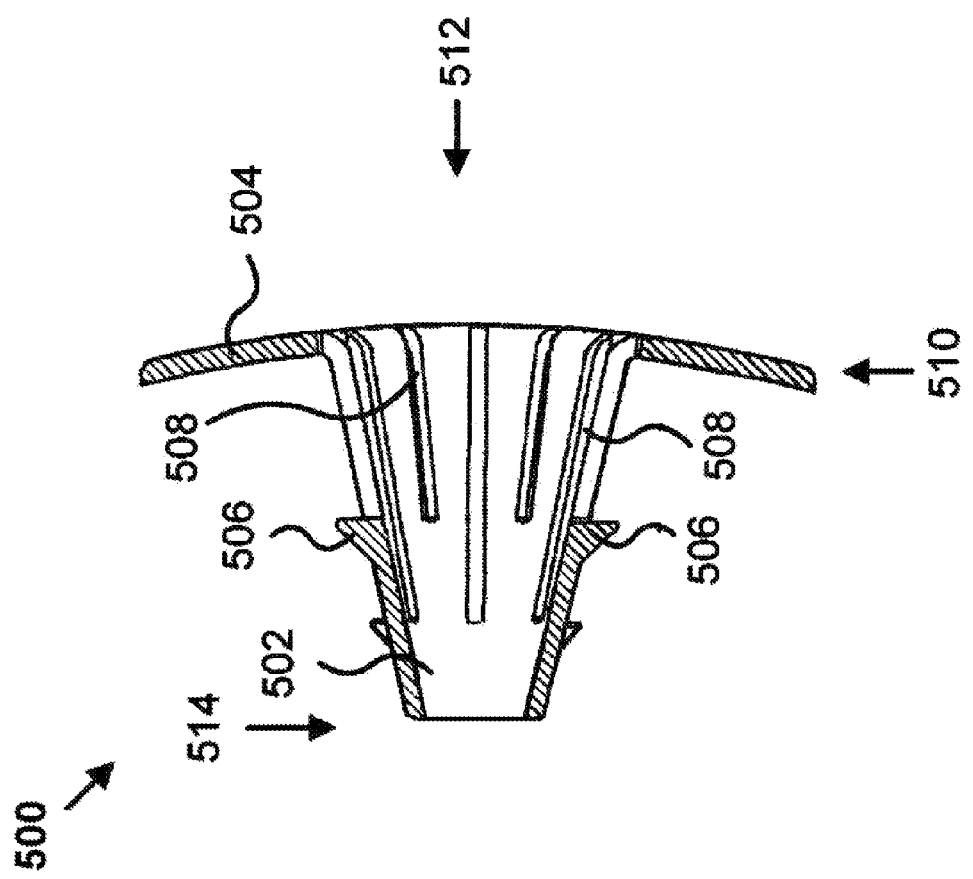
FIG. 12 is a cross-sectional view of the embodiment illustrated in FIG. 10.

FIGS. 10-12 illustrate an alternative embodiment of an insertable device 500. The device 500 comprises a funnel 502, a flange 504, protruding members 506, and apertures 508. The device 500 further includes a first end 510, an opening 512, a second end 514, and a narrow opening 516. In the depicted embodiment, the apertures 508 are slots that extend partially along the length of funnel 502. Located near the second end 514 at one end of the slots 508 are protruding members 506. The protruding members 506 may resemble barbs. In one embodiment, one or more protruding members 506 may include a sharpened edge or blade to cut an opening into a container 450.

As discussed, the protruding members 506 preferably secure the insertable device 500 to a container. In one embodiment, the protruding members 506 are formed from the material removed from the slots 508 during manufacture. The slots 508 may encourage the insects to advance from the wider opening 512 to the narrower opening 516 and into the container.

The funnel 502 is preferably sized relative to the type or size of pest that is to be trapped. For example, the funnel 500 may be smaller to catch white flies, or larger to catch moths. In a contemplated embodiment, the funnel 502 may even be large enough to capture mice or other small rodents.

Figure 13:
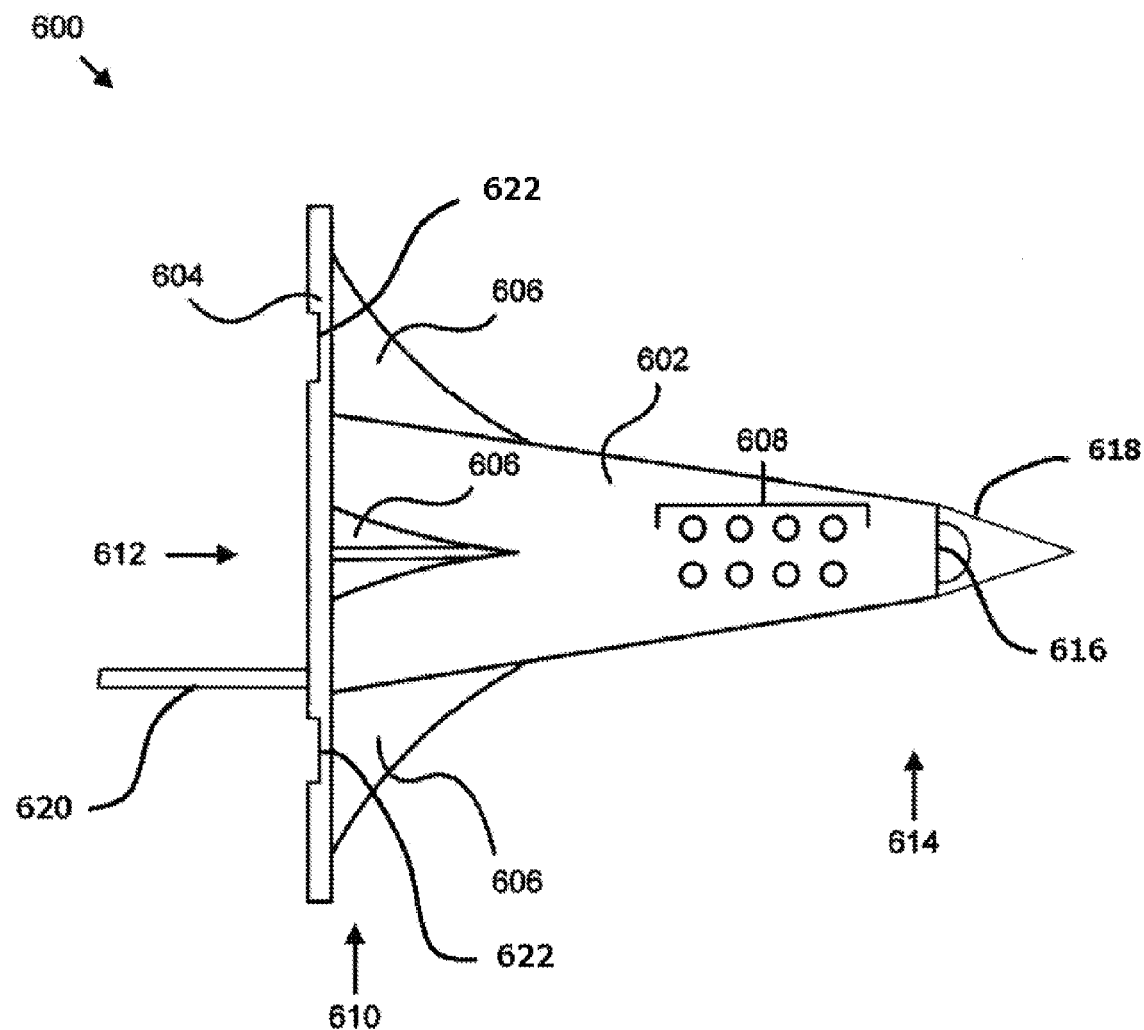
FIG. 13 is a side orthographic view of an alternative embodiment of an insertable device in accordance with the present invention.
Figure 15:
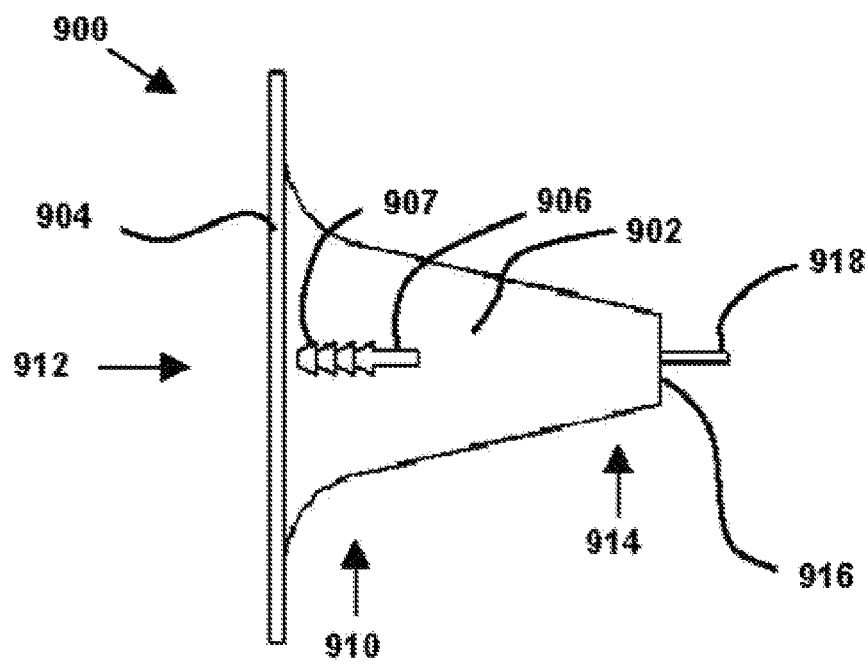
FIG. 15 is a top orthographic view of the alternative embodiment of an insertable device depicted in FIG. 14.

FIG. 13 illustrates yet another embodiment of an insertable device 600 in accordance with the present invention. The device 600 may include a funnel 602, a flange 604, protruding members 606, and a screen 608. The device 600 may further include a first end 610, a larger opening 612, a second end 614, a narrow opening 616, and a container piercing blade-like member 618. In one embodiment, the protruding members 606 are positioned near the first end 610 and are attached to the flange 604. The protruding members 606 may be sloped to engage the wall of a container when the device 600 is inserted into the container. Device 600 further includes an attractant support device 620, for supporting meat or other attractants, protruding from device 600. Flange 604 of device 600 further includes retention grooves 622 which provide for the mounting of device 600 to a container by placing an elastic band in a compressively retaining relationship to grooves 622 of device 600 and a container.

In one embodiment, the device 600 may include only two protruding members 606. Accordingly, the protruding members 606 are configured to slide into a slit formed in the wall of a container such as the slit initiated by blade-like member 618. The protruding members 606 consequently engage the wall of the container in the slit. As a result, the device 600 may be sufficiently secured to the container, while still permitting the device 600 to be easily removed.

As discussed, in certain embodiments, a screen 608 allows an attractant to escape the funnel 602, while preventing small insects from crawling in and out of the slots. In the depicted embodiment, the screen 608 replaces the apertures to enhance dissemination of the attractant.

To help capture flying insects, a container with one or more insertable devices may be hung in an open area to attract the insects. In one embodiment, a cap with an eyelet for hanging a container may be provided. The cap may further include a strap for hanging the container. In a contemplated embodiment, the cap may comprise a light source to attract insects.

Figure 14:
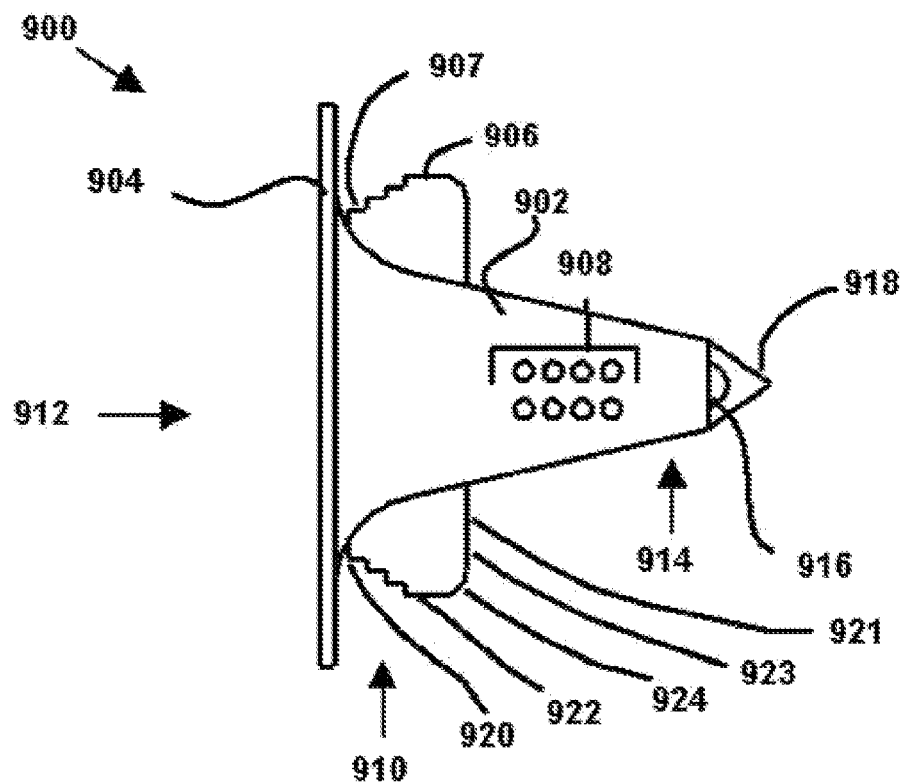
FIG. 14 is a side orthographic view of an alternative embodiment of an insertable device in accordance with the present invention.

FIG. 14 illustrates yet another embodiment of an insertable device 900 in accordance with the present invention. The device 900 may include a funnel 902, a flange 904, at least one protruding member 906 having at least one barb 907, and a screen 908. The device 900 may further include a first end 910, a larger opening 912, a second end 914, a narrow opening 916, and a container piercing blade-like member 918. The at least one protruding member 906 extends in substantially a single plane which is parallel with a longitudinal axis of the insertable device 900. The at least one protruding member 906 has a first end 920 which is located between the flange 904 and the at least one protruding member second end 921 along a longitudinal axis of the insertable device 900. The at least one protruding member second end 921 is located between the at least one protruding member first end 920 and the funnel second end 914. The at least one protruding member 906 having first 922 and second 923 edges and a corner 924 defined by an intersection of said first 922 and second 923 edges. The first edge 922 extending from the at least one protruding member first end 920 toward the corner 924. The second edge 923 extending from the external surface of the funnel perpendicularly away from the longitudinal axis of the insertable device 900 to intersect the first edge 922 at the corner 924, and the first edge 922 having the at least one barb 907 thereon which projects transversely from the substantially single plane in which at least one protruding member extends. Device 900 is adapted such that when device 900 is pressed against a container side wall, blade-like member 918 pierces a hole the container side wall. Device 900 is further adapted such that when device 900 is pressed into a container side wall hole, at least one barb 907 engages the container side wall to retain device 900 in an inserted position in the container.

As discussed, in certain embodiments, a screen 908 allows an attractant to escape the funnel 902, while preventing small insects from crawling in and out of the slots. In the depicted embodiment, the screen 908 replaces the apertures to enhance dissemination of the attractant.

Figure 16:
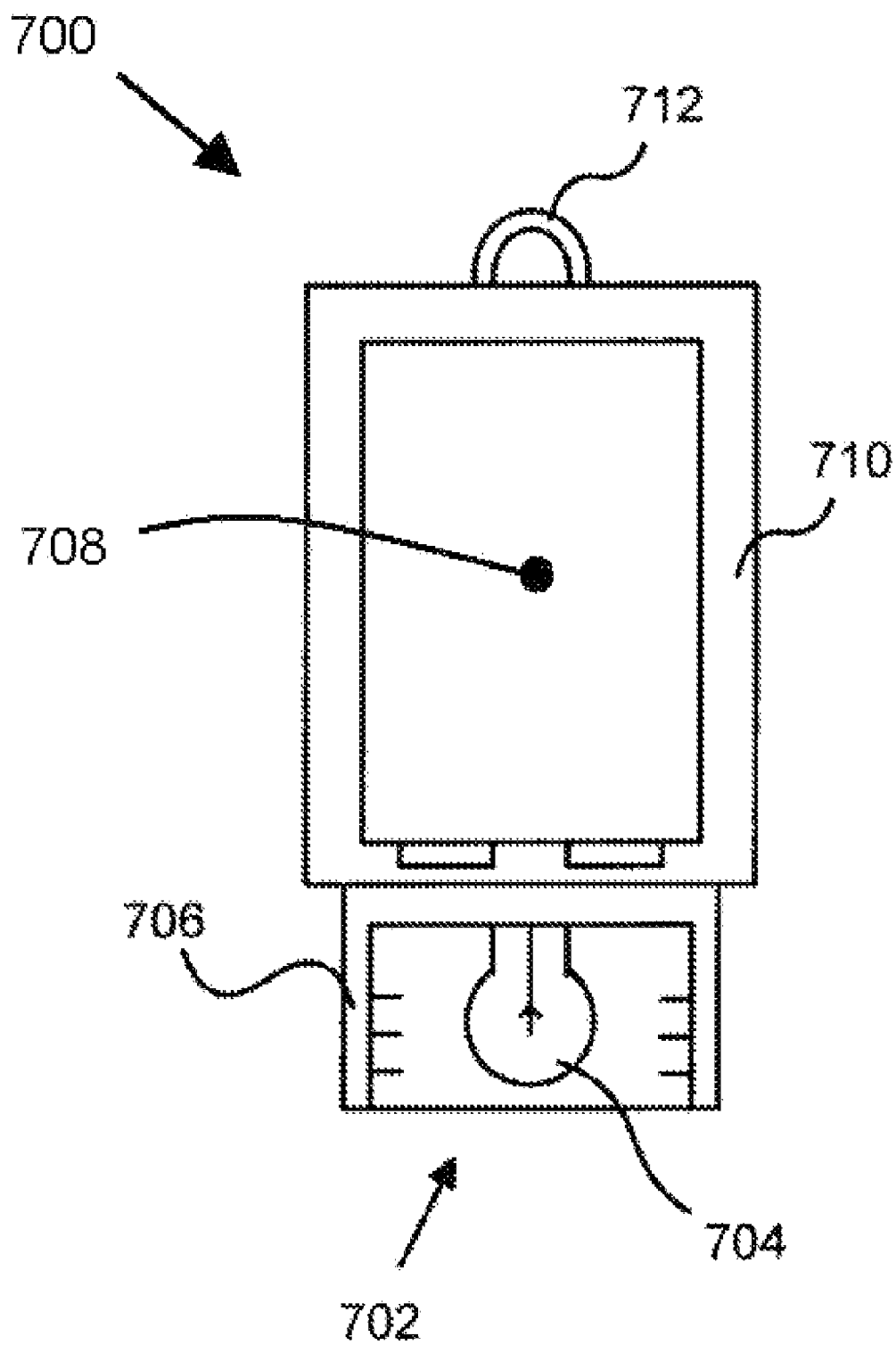
FIG. 16 is a cross-sectional side view of one embodiment of a lighted cap in accordance with the present invention—cross-hatching is not shown for clarity.

FIG. 16 illustrates one embodiment of a cap 700 with a light source 702 in accordance with the present invention. The cap 700 may be extended to include pertinent functioning components. A light bulb 704 may be located within a threaded cap 706. Consequently, the light source 702 lights up the inside of a container, such as a two liter plastic bottle.

Figure 17:
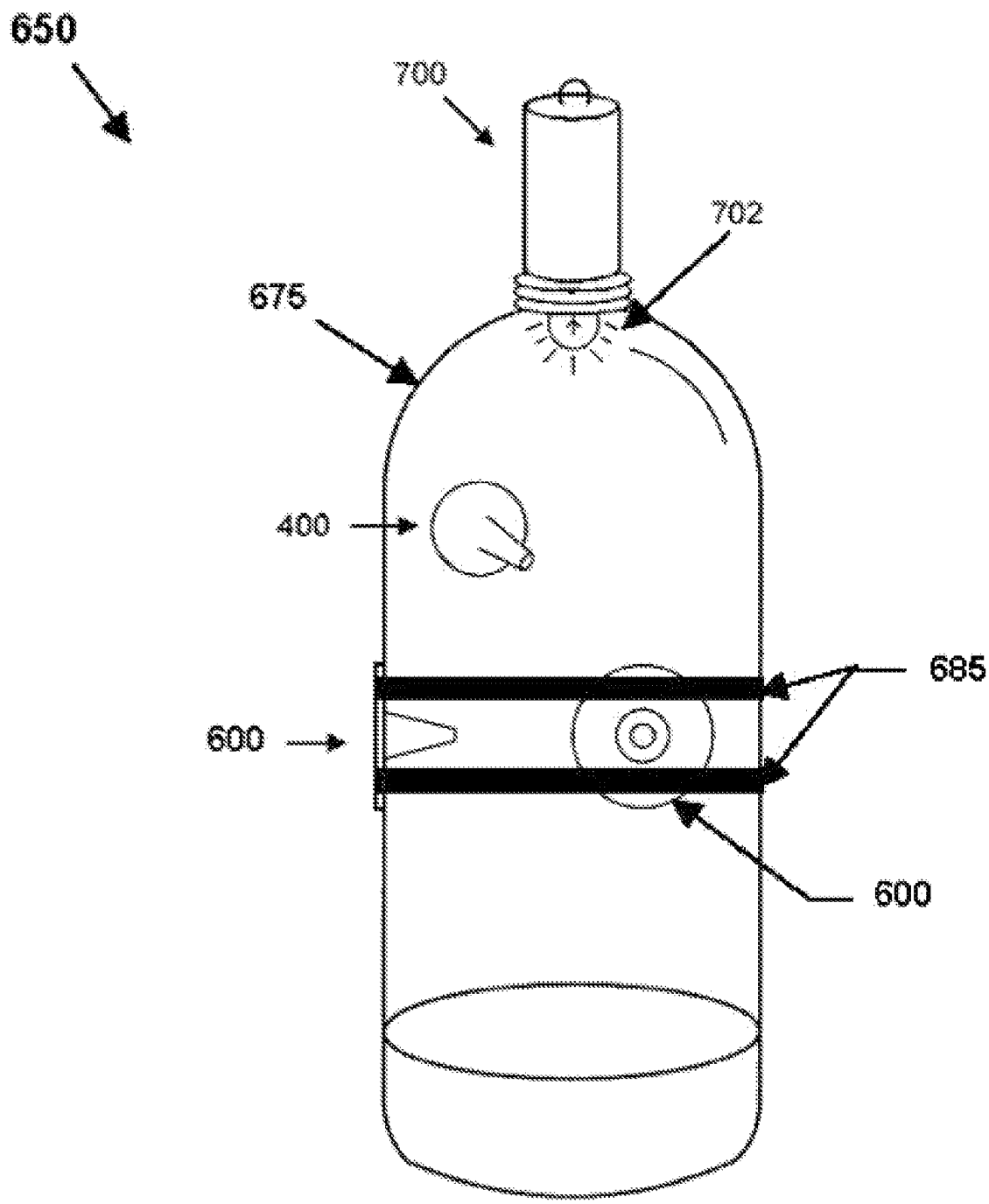
FIG. 17 is a perspective view of a disposable plastic bottle with multiple devices inserted in the side of the bottle, two of the devices are shown retained by a rubber band, and with a lighted cap in accordance with the present invention; a portion of the bottle being shown as substantially transparent so as to reveal the light and insertable devices and that are inserted on the far side of the figure.

FIG. 17 illustrates insect catching apparatus 650 comprising a plastic bottle 675 with insertable devices 400 and 600 and a lighted cap 700. Bottle 675 may be an empty two-liter volume soda pop bottle. When the cap 700 is screwed onto a bottle 675, an activated light source 702 attracts insects to the bottle 675. Such an embodiment may be useful to capture flies, fireflies, moths, mosquitoes, and the like. Enclosed areas, such as tents, greenhouses, storage areas, and the like, may especially benefit from a lighted insect trap. Further, FIG. 17 illustrates additional means of securing device 600 to bottle 675. A first additional means of securing device 600 to bottle 675 is the placement of elastic band 685 in compressive retention relationship to grooves 622 of device 600. A second additional means of securing device 600 to bottle 675 is by placing an adhesive between flange 604 and bottle 675 such that device 600 is adhered to bottle 675.

Referring back to FIG. 16, the light bulb 704 may be powered by a battery 708, such as a nine-volt battery. As depicted, the cap 700 may be extended to house the battery 708. The housing 710 may resemble various shapes and may be made from plastic or other suitable material. The cap 700 may further include an eyelet 712 to hang the container if desired.

The light source 702 within the cap 700 may have various characteristics. In one embodiment, the light source 702 may have multiple modes, such as blinking, sustained, bright, photo switch, timed lighting, and the like. In addition, the light source 702 may be waterproof. In one embodiment, the light source 702 is a Light-Emitting Diode (LED) light powered by a battery 708. In a further embodiment, the light source 702 may be embodied in an adaptable device that may be placed in various locations throughout the container, such as the bottom of the container or on the side of the container.

The present invention may be adaptable to function in multiple situations. For example, the insertable device may be used to capture crawling pests as well. A container, such as a bottle 450, with an insertable device may be placed on the ground. In one embodiment, the trap may include a ramp to lead slugs, roaches and other crawling insects, and/or rodents into the trap.

Figure 18:
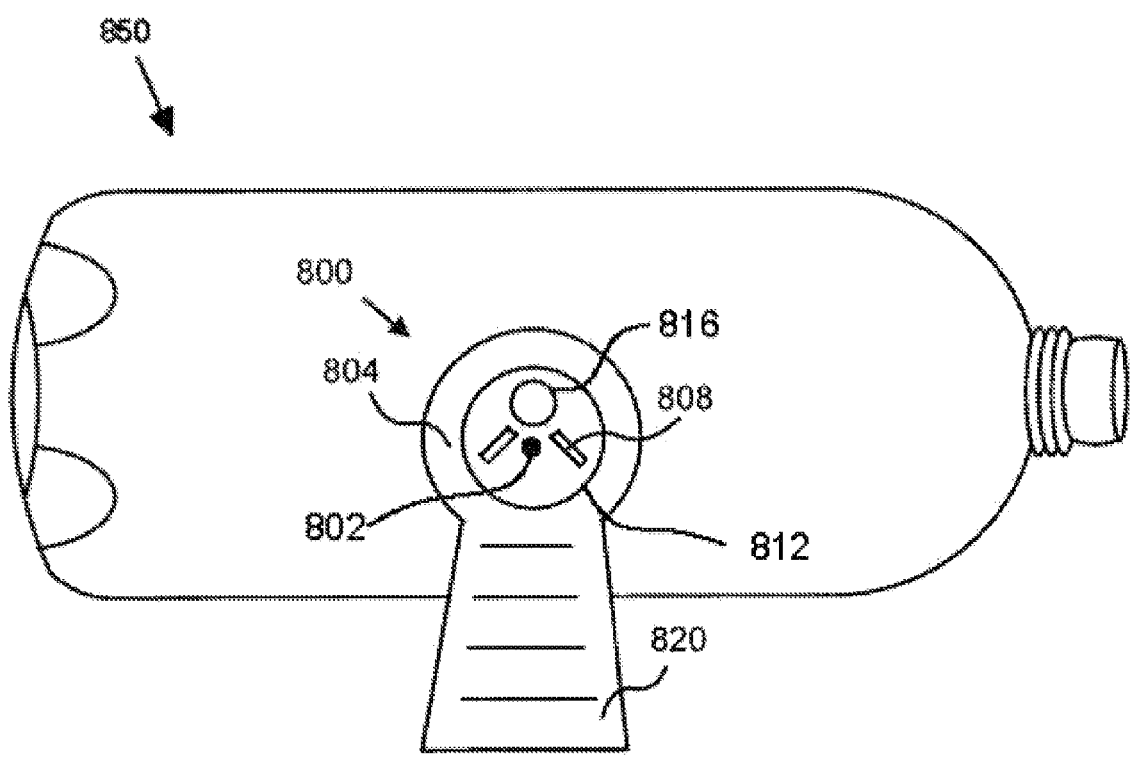
FIG. 18 is a perspective view of one embodiment of an insertable device in accordance with the present invention inserted into a disposable plastic bottle.

FIG. 18 illustrates one embodiment of an insertable device 800 with a ramp 820. The device 800 is inserted into a two liter plastic bottle 850. The device 800 may include a funnel 802, a flange 804, protruding members (not shown), and apertures 808. The device 800 may further include a first end having a wider opening 812 and a second end having a narrower opening 816. Consequently, the device 800 may be inserted into the side of a container 850. An attractant or bait may be placed within the container 850. Crawling insects or rodents may then crawl up the ramp 820 to enter the funnel 802. Once inside of the container 850, the insects or rodents are not able to exit through the narrow opening 816 of funnel 802.

In certain instances, narrow opening 816 of the second end may include a one-way flap or covering that functions as a swinging door. The flap may permit a creature to enter the container 850 through the funnel 802, but preferably prevents passage out of the container 850.

In yet another embodiment, the container may include a decorative covering (not shown) to hide the captured insects from view. Alternatively or in addition, the container may also be decorated to appeal to the user and/or to hide the insects. In certain embodiments, the insertable device may include additional apparatus to close the opening of the funnel. For example, a flat circular member may be pivotally attached to the flange such that the circular member may be rotated to block the wide opening. Apparatus to close the wide opening of the funnel may be useful when discarding a container full of insects if the user does not intend to reuse the insertable device.

Figure 19:
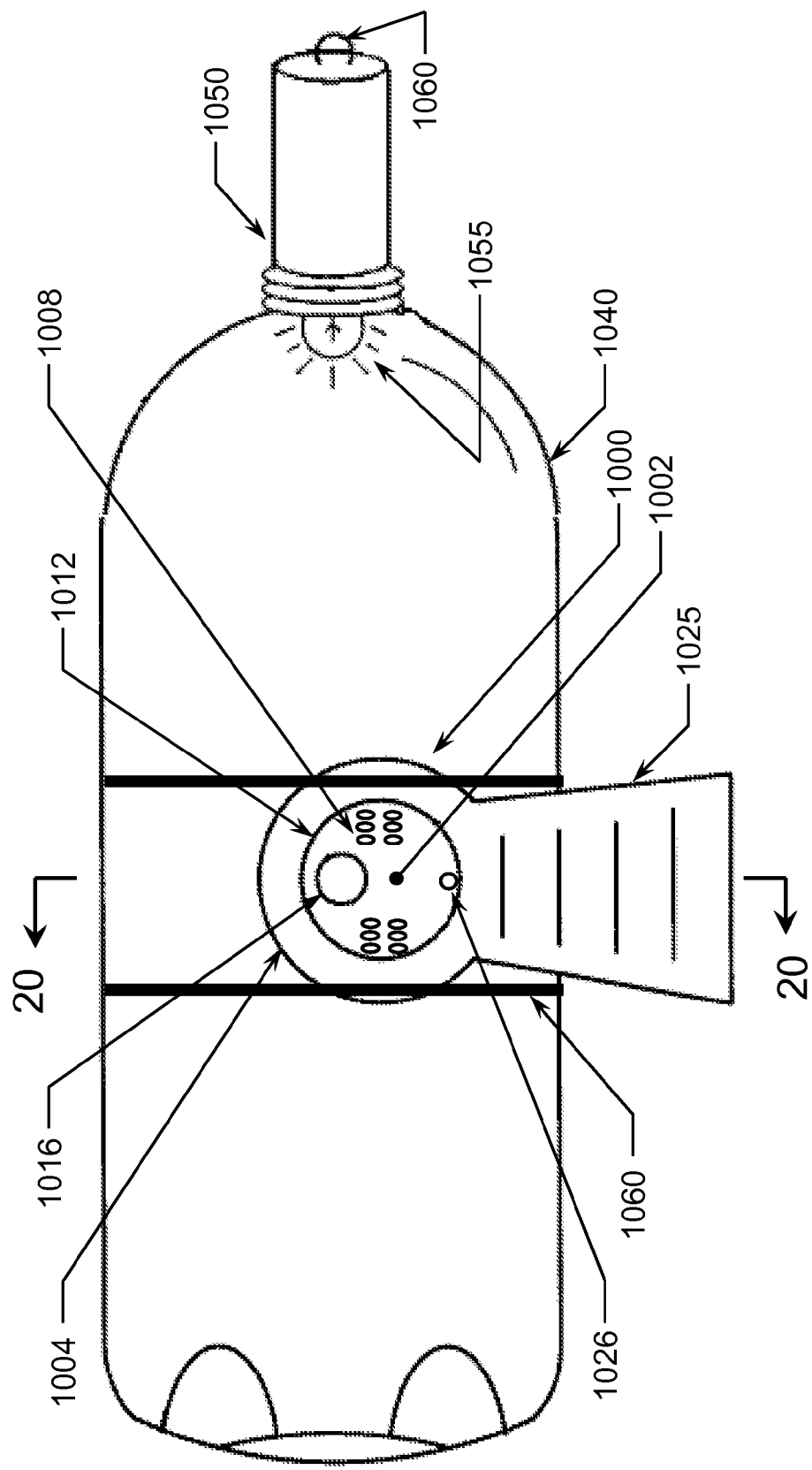
FIG. 19 is a side view of an alternate embodiment of the insertable pest catching device shown inserted and retained in the wall of a disposable plastic bottle having a light emitting cap and an eyelet.
Figure 21:
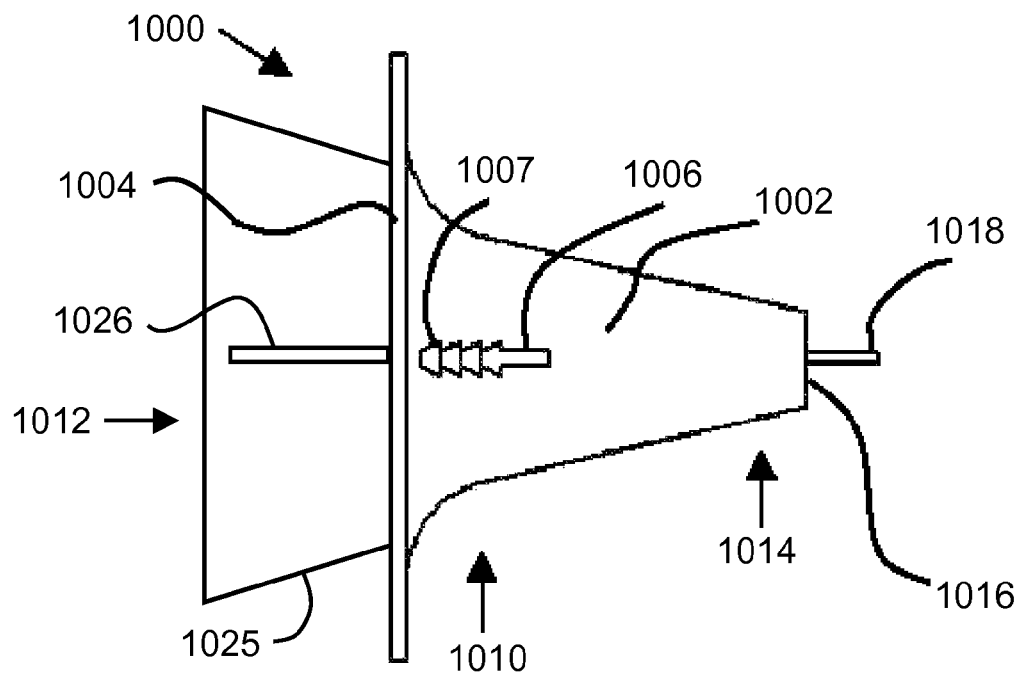
FIG. 21 is a top view of the embodiment shown in FIG. 19.
Figure 20:
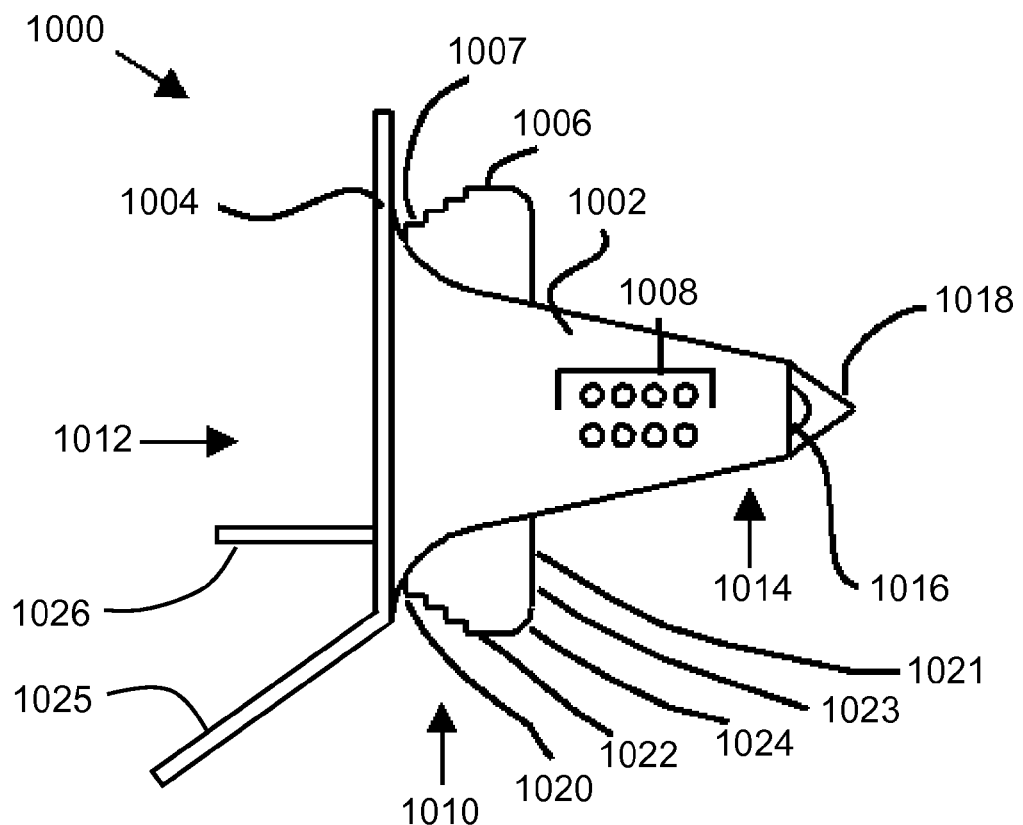
FIG. 20 is a sectional view of the embodiment shown in FIG. 19, with the viewing plane indicated in FIG. 20 by section arrows 20.

FIGS. 19 through 21 illustrate yet another embodiment of an insertable device 1000 in accordance with the present invention. The device 1000 may include a funnel 1002, a flange 1004, at least one retention member 1006 having at least one barb 1007, and a screen 1008, with flange 1004 being connected to funnel 1002, and at least one retention member 1006 being connected to funnel 1002 and flange 1004, and screen 1008 being formed in funnel 1002. The device 1000 may further include a first end 1010, a larger opening 1012, a second end 1014, a narrow opening 1016, and a container piercing blade-like member 1018. The at least one retention member 1006 extends in substantially a single plane which is parallel with a longitudinal axis of the insertable device 1000. The at least one retention member 1006 has a first end 1020 which is located between the flange 1004 and the at least one protruding member second end 1021 along a longitudinal axis of the insertable device 1000. The at least one retention member second end 1021 is located between the at least one retention member first end 1020 and the funnel second end 1014. The at least one retention member 1006 having first 1022 and second 1023 edges and a corner 1024 defined by an intersection of said first 1022 and second 1023 edges. The first edge 1022 extending from the at least one retention member first end 1020 toward the corner 1024. The second edge 1023 extending from the external surface of the funnel perpendicularly away from the longitudinal axis of the insertable device 1000 to intersect the first edge 1022 at the corner 1024, and the first edge 1022 having the at least one barb 1007 thereon which projects transversely from the substantially single plane in which at least one protruding member extends. Device 1000 is adapted such that when device 1000 is pressed against a container side wall, blade-like member 1018 pierces a hole the container side wall. Device 1000 is further adapted such that when device 1000 is pressed into a container side wall hole, at least one barb 1007 engages the container side wall to retain device 1000 in an inserted position in the container. It is noted that device 1000 may optionally be provided without funnel 1002, in which case, once a pest passes through opening 1012, the pest enters a container inner cavity.

Device 1000 further includes apertures 1008 located in funnel 1002 to allow an attractant aroma to escape the funnel 1002, while preventing small insects from crawling in and out of the apertures. Device 1000 further includes an attractant support 1026 extending from flange 1004 to provide support for a replaceable attractant such as a piece of raw meat or the like. It is also noted that flange 1004 of device 1000 is preferably substantially similar to flange 404 of device 400 as shown in FIGS. 6 through 8, in that flange 1004 is curved to adapt to the external surface of a container surface such as the cylindrical surface of a two liter volume soda pop bottle. However, flange 1004 may alternately be substantially flat as shown in FIGS. 20 and 21. Device 1000 also includes ramp 1025 connected to and extending from flange 1004. When device 1000 is inserted into a container and placed on a surface such as the ground, ramp 1025 provides for crawling inspect and like creature ingress into the container.

FIG. 19 illustrates the insertion of device 1000 into a two liter volume type plastic soda pop bottle 1040. Device 1000 is retained to bottle 1040 by at least one retention member 1006 and at least one barb 1007. Device 1000 is also secured to bottle 1040 be means of at least one rubber band 1060 or like elastomeric strap being placed in compressive retention relationship to flange 1004 and bottle 1040. Device 1000 may be further secured to bottle 1040 by means of an adhesive being placed between flange 1004 and bottle 1040 so as to bond device 1000 to bottle 1040. It is noted that bottle 1040 includes lighted cap 1050 having a light bulb 1055 and an eyelet 1060. It is noted that lighted cap 1050 is substantially identical to cap 700. It is also noted that bottle 1040 preferably includes an odor producing attractant contained within bottle 1040.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An insertable pest trapping apparatus for inserting into a container in order to trap pests inside a container, said apparatus comprising:
   a funnel having a first end and a second end which define a longitudinal axis of said funnel therebetween, said first end having a wide opening and said second end having a narrow opening;
   a flange attached to said first end of said funnel, said flange being curved such that said flange forms a portion of a cylindrical wall, and wherein an axis of said cylindrical wall portion is substantially perpendicular to said axis of said funnel and extends through said funnel; and
   at least one retention member extending from an external surface of said funnel, said at least one retention member being configured so as to secure said funnel to a container when said apparatus is at least partially inserted into a container wall.

2. The apparatus of claim 1, wherein said apparatus further includes at least one member of the following group of members connected to said apparatus, said group of members comprising an attractant support member, a blade member, and a ramp member.

3. The apparatus of claim 2, wherein said attractant support member includes an attractant supported on said attractant support member, and wherein said ramp member extends from said flange and wherein said ramp member facilitates ingress of a pest into said funnel, and wherein said blade member extends from said funnel second end, and wherein said blade member is adapted to pierce a plastic container wall when said blade member is pressed against the plastic container wall.

4. The apparatus of claim 2, wherein said apparatus is combined with a container, and wherein said funnel is retentatively inserted into a wall of said container, and wherein said container is rested upon a support surface, and wherein said ramp member provides a bridge between said funnel and said support surface such that a pest may crawl from said support surface along said ramp member and into said funnel.

5. The apparatus of claim 2, wherein said apparatus is combined with a container, and wherein said funnel is retentatively inserted into a wall of said container, and wherein said apparatus is further secured to said container by at least one of an elastomeric band and a layer of adhesive, and wherein said container defines a plastic bottle container, and wherein said container contains an odor generating attractant within said container, and wherein said container includes a light within said container, and wherein said container includes an eyelet from which said container may be suspended.

6. The apparatus of claim 1, wherein said apparatus further includes at least one aperture in a surface of said funnel such that an attractant odor circulates through said funnel, when an odor generating attractant is in near proximity to said funnel.

7. The apparatus of claim 6, wherein said at least one aperture defines a plurality of apertures, and wherein said plurality of apertures are of such a size that a pest is prevented from passing freely passing through one of said apertures.

8. The apparatus of claim 1, wherein said at least one retention member includes at least one barb connected to said at least one retention member such that when said at least one retention member is at least partially pressed into the wall of the container, said at least one barb engages the wall of the container to secure said apparatus to the container.

9. The apparatus of claim 1, wherein said apparatus is combined with a container, and wherein said funnel is retentatively inserted into a wall of said container.

10. An insertable pest trapping apparatus for inserting into a container in order to trap pests inside a container, said apparatus comprising:
    a funnel having a first end and a second end which define a longitudinal axis of said funnel therebetween, said first end having a wide opening and said second end having a narrow opening;
    a flange attached to said first end of said funnel, said flange being curved such that said flange forms a portion of a cylindrical wall, and wherein an axis of said cylindrical wall portion is substantially perpendicular to said axis of said funnel and extends through said funnel; and
    at least one retention member extending from an external surface of said funnel, said at least one retention member being configured so as to secure said funnel to a container when said apparatus is at least partially inserted into a container wall; and wherein said apparatus includes at least one member of the following group of members connected to said apparatus, said group of members comprising an attractant support member, a blade member, and a ramp member.

11. The apparatus of claim 10, wherein said attractant support member includes an attractant supported on said attractant support member, and wherein said ramp member extends from said flange and wherein said ramp member facilitates ingress of a pest into said funnel, and wherein said blade member extends from said funnel second end, and wherein said blade member is adapted to pierce a plastic container wall when said blade member is pressed against the plastic container wall.

12. The apparatus of claim 10, wherein said apparatus further includes at least one aperture in a surface of said funnel such that an attractant odor circulates through said funnel, when an odor generating attractant is in near proximity to said funnel.

13. The apparatus of claim 12, wherein said at least one aperture defines a plurality of apertures, and wherein said plurality of apertures are of such a size that a pest is prevented from passing freely passing through one of said apertures.

14. The apparatus of claim 10, wherein said at least one retention member includes at least one barb connected to said at least one retention member such that when said at least one retention member is at least partially pressed into the wall of the container, said at least one barb engages the wall of the container to secure said apparatus to the container.

15. The apparatus of claim 10, wherein said apparatus is combined with a container, and wherein said funnel is retentatively inserted into a wall of said container.

16. The apparatus of claim 10, wherein said apparatus is combined with a container, and wherein said funnel is retentatively inserted into a wall of said container, and wherein said container is rested upon a support surface, and wherein said ramp member provides a bridge between said funnel and said support surface such that a pest may crawl from said support surface along said ramp member and into said funnel.

17. The apparatus of claim 10, wherein said apparatus is combined with a container and wherein said funnel is retentatively inserted into a wall of said container, and wherein said apparatus is further secured to said container by at least one of an elastomeric band and a layer of adhesive, and wherein said container defines a plastic bottle container, and wherein said container contains an odor generating attractant within said container, and wherein said container includes a light within said container, and wherein said container includes an eyelet from which said container may be suspended.

18. An insertable pest trapping apparatus for inserting into a container to trap pests inside of a container, said apparatus comprising:
> a substantially conical shaped hollow member having a first end and a second end which define a longitudinal axis of said substantially conical shaped hollow member therebetween, said first end having a first wide opening and said substantially conical shaped hollow member having a second narrow opening;
> a flange attached to said first end of said substantially conical shaped hollow member, said flange being curved such that said flange forms a portion of a cylindrical wall, and wherein an axis of said cylindrical wall portion is substantially perpendicular to said axis of said substantially conical shaped hollow member and extends through said substantially conical shaped hollow member; and
> at least one retention member extending from an external surface of said substantially conical shaped hollow member, said at least one retention member being configured so as to secure said apparatus to a container when said apparatus is at least partially inserted into a container wall.

19. The apparatus of claim 18, wherein said second narrow opening forms an opening at said second end of said substantially conical shaped hollow member.

20. An insertable pest trapping apparatus for inserting into a container in order to trap pests inside a container, said apparatus comprising:
> a hollow member having a first end and a second end which define a longitudinal axis of said hollow member therebetween;
> a flange attached to said first end of said hollow member, said flange being curved such that said flange forms a portion of a cylindrical wall, and wherein an axis of said cylindrical wall portion is substantially perpendicular to said axis of said hollow member and extends through said hollow member, said flange having at least one access hole formed within said flange;
> at least one retention member extending from said flange, said at least one retention member being configured so as to secure said flange to a container when said apparatus is at least partially inserted into a container wall; and
> a ramp extending from said flange, said ramp being configured such that when said apparatus is retentively inserted into a wall of a container and said container is rested upon a support surface, said ramp provides a bridge between said flange and said support surface such that a pest may crawl from said support surface along said ramp and into said access hole.

21. An insertable pest trapping apparatus for inserting into a container in order to trap pests inside a container, said apparatus comprising:
> a funnel having a first end and a second end, said first end having a wide opening and said second end having a narrow opening;
> a flange attached to said first end of said funnel, said flange being curved such that said flange forms a portion of a cylindrical wall, and wherein an axis of said cylindrical wall portion is substantially perpendicular to said axis of said funnel and extends through said funnel; and
> at least one retention member extending from an external surface of said funnel, said at least one retention member being configured so as to secure said funnel to a container when said apparatus is at least partially inserted into a container wall; and wherein said apparatus is combined with a container, and wherein said apparatus is retentatively inserted into a wall of said container.

22. The apparatus of claim 21, wherein said apparatus further includes at least one member of the following group of members connected to said apparatus, said group of members comprising an attractant support member, a blade member, and a ramp member.

23. The apparatus of claim 22, wherein said container is rested upon a support surface, and wherein said ramp member provides a bridge between said funnel and said support surface such that a pest may crawl from said support surface along said ramp member and into said funnel.

24. The apparatus of claim 21, wherein said apparatus is further secured to said container by at least one of an elastomeric band and a layer of adhesive, and wherein said container defines a plastic bottle container, and wherein said container contains an odor generating attractant within said container, and wherein said container includes a light emanating from within said container, and wherein said container includes an eyelet from which said container may be suspended.

25. An insertable pest trapping apparatus for inserting into a container in order to trap pests inside a container, said apparatus comprising:
> a funnel having a first end and a second end which define a longitudinal axis of said funnel therebetween, said first end having a wide opening and said second end having a narrow opening;
> a flange attached to said first end of said funnel, said flange being curved such that said flange forms a portion of a cylindrical wall, and wherein an axis of said cylindrical wall portion is substantially perpendicular to said axis of said funnel and extends through said funnel; and
> at least one retention member extending from an external surface of said funnel, said at least one retention member being configured so as to secure said funnel to a container when said apparatus is at least partially inserted into a container wall; and wherein said apparatus includes at least one member of the following group of members connected to said apparatus, said group of members comprising an attractant support member, a blade member, and a ramp member, and wherein said apparatus is combined with a container, and wherein said apparatus is retentatively inserted into a wall of said container, and wherein said container is rested upon a support surface, and wherein said ramp member provides a bridge between said funnel and said support surface such that a pest may crawl from said support surface along said ramp member and into said funnel, and wherein said apparatus is further secured to said container by at least one of an elastomeric band and a layer of adhesive, and wherein said container defines a plastic bottle container, and wherein said container contains an odor generating attractant within said container, and wherein said container includes a light within said container, and wherein said container includes an eyelet from which said container may be suspended.

* * * * *

UNITED STATES PATENT AND TRADEMARK OFFICE
CERTIFICATE OF CORRECTION

PATENT NO.         : 7,503,142 B1
APPLICATION NO. : 11/688204
DATED              : March 17, 2009
INVENTOR(S)        : Michael A. Uhl It is certified that error appears in the above-identified patent and that said Letters Patent is hereby corrected as shown below:

On the title page, item [74] after the heading and words "Primary Examiner - Darren W Ark", the patent should include the following heading and name, "Attorney, Agent, or Firm - Michael R. Schramm".

Signed and Sealed this

Twenty-first Day of April, 2009

JOHN DOLL
*Acting Director of the United States Patent and Trademark Office*